US009524444B2

(12) United States Patent
Elinas et al.

(10) Patent No.: US 9,524,444 B2
(45) Date of Patent: Dec. 20, 2016

(54) METHOD, SYSTEM AND APPARATUS FOR DETERMINING A CONTOUR SEGMENT FOR AN OBJECT IN AN IMAGE CAPTURED BY A CAMERA

(71) Applicant: CANON KABUSHIKI KAISHA, Tokyo (JP)

(72) Inventors: Pantelis Elinas, Glebe (AU); Xin Yu Liu, Marsfield (AU)

(73) Assignee: Canon Kabushiki Kaisha, Tokyo (JP)

( * ) Notice: Subject to any disclaimer, the term of this patent is extended or adjusted under 35 U.S.C. 154(b) by 77 days.

(21) Appl. No.: 14/514,258

(22) Filed: Oct. 14, 2014

(65) Prior Publication Data

US 2015/0104106 A1 Apr. 16, 2015

(30) Foreign Application Priority Data

Oct. 16, 2013 (AU) .................. 2013245477

(51) Int. Cl.
*G06K 9/46* (2006.01)
*G06K 9/48* (2006.01)
*G06T 7/00* (2006.01)

(52) U.S. Cl.
CPC ............. *G06K 9/4638* (2013.01); *G06K 9/48* (2013.01); *G06T 7/0083* (2013.01);
(Continued)

(58) Field of Classification Search
CPC .... G06K 9/00; G06K 9/0008; G06K 9/00093; G06K 9/007; G06K 9/0063; G06K 9/3241; G06K 9/3275; G06K 9/34; G06K 9/46; G06K 9/4604; G06K 9/4638; G06K 9/48; G06K 9/481; G06K 9/6202; G06K 2009/3225; G06K 2209/01; G06K 2209/19; G06T 7/00; G06T 7/004; G06T 7/0042; G06T 7/0046; G06T 7/0051; G06T 7/0067; G06T 7/0081; G06T 7/0083; G06T 7/0085; G06T 7/0089; G06T 11/203; G06T 11/60; G06T 19/20; G06T 2207/10016; G06T 2207/10024; G06T 2207/20072; G06T 2207/30204; G06T 2207/30232; H04N 1/00681; H04N 1/00708; H04N 1/0071; H04N 1/00713; H04N 1/00737; H04N 1/00753; H04N 1/00795; G06F 17/214
See application file for complete search history.

(56) References Cited

U.S. PATENT DOCUMENTS 4,876,728 A * 10/1989 Roth .................... G06K 9/34
348/94
6,304,677 B1 * 10/2001 Schuster ............... G06K 9/222
345/442
(Continued)

OTHER PUBLICATIONS

Topal, Cihan, and Cuneyt Akinlar. "Edge Drawing: A combined real-time edge and segment detector". Journal of Visual Communication and Image Representation 23.6, Aug. 2012: 862-872.
Caselles, Vicent, Ron Kimmel, and Guillermo Sapiro. "Geodesic active contours". International Journal of Computer Vision 22.1 Feb. 1997: 61-79.
Corner Detection, Apr. 2006, accessed at: http://en.wikipedia.org/wiki/Corner_detection#The_Harris_.26_Stephens_.2F_Plessey_corner_detection_algorithm.
Canny Edge Detector, Feb. 2004, accessed at: http://en.wikipedia.org/wiki/Canny_edge_dector#Nonmaximum_suppression.
(Continued)

*Primary Examiner* — Jose Couso
(74) *Attorney, Agent, or Firm* — Canon USA, Inc. I.P. Division

(57) ABSTRACT

A method of determining a contour segment for an object in an image captured by a camera is disclosed. A plurality of corner points located on a part of an object in the image is determined. Pairs of corner points are selected from the determined corner points. A path for at least one of the pairs of corner points is determined, the path connecting the corner points of the at least one pair of corner points along the boundary of the object. The contour segment is determined for the object using the determined path.

21 Claims, 13 Drawing Sheets

(52) U.S. Cl.
CPC .. *G06T 7/0089* (2013.01); *G06T 2207/10016* (2013.01); *G06T 2207/10024* (2013.01); *G06T 2207/20072* (2013.01); *G06T 2207/30232* (2013.01)

(56) References Cited

U.S. PATENT DOCUMENTS

| | | | | |
|---|---|---|---|---|
| 6,636,231 | B1* | 10/2003 | Ali-Santosa | G06T 11/203 345/443 |
| 6,735,343 | B2* | 5/2004 | Michael | G06K 9/4604 345/420 |
| 7,030,881 | B2* | 4/2006 | Perry | G06F 17/214 345/179 |
| 7,409,092 | B2 | 8/2008 | Srinivasa | |
| 7,587,088 | B2* | 9/2009 | Beikirch | G06K 9/48 382/173 |
| 7,826,666 | B2* | 11/2010 | Hamza | G06T 7/004 382/218 |
| 8,253,802 | B1* | 8/2012 | Anderson | G06T 7/0089 348/169 |
| 8,326,045 | B2* | 12/2012 | Beikirch | G06K 9/48 382/173 |
| 2010/0092079 | A1* | 4/2010 | Aller | G06K 9/3216 382/165 |
| 2013/0101186 | A1* | 4/2013 | Walch | G06K 9/00093 382/125 |
| 2014/0160117 | A1* | 6/2014 | Nehmadi | G06F 3/0304 345/419 |
| 2015/0093018 | A1* | 4/2015 | Macciola | G06T 3/00 382/154 |

OTHER PUBLICATIONS

Lucas-Kanade method, Jan. 2006, accessed at: http://en.wikipedia.org/wiki/Lucas%E2%80%93Kanade_method.

Bouguet, Jean-Yves. "Pyramidal implementation of the affine lucas kanade feature tracker description of the algorithm". Intel Corporation 5 (2001), accessed at: http://robots.stanford.edu/cs223b04/algo_tracking.pdf. (The year of publication for this reference is sufficiently earlier than the effective U.S. filing date and any foreign priority date so that the particular month of publication is not in issue.).

Image Gradient, Apr. 2006,accessed at: http://en.wikipedia.org/wiki/Image_gradient.

A* search algorithm, Oct. 2002, accessed at: http://en.wikipedia.org/wiki/A*#Admissability_and_optimality.

Euclidean distance, May 2002, accessed at: http://en.wikipedia.org/wiki/Euclidean_distance.

Taxicab geometry, Dec. 2003, accessed at: http://en.wikipedia.org/wiki/Manhattan_distance.

Hash table, Sep. 2001, accessed at: http://en.wikipedia.org/wiki/Hash_table#Collision_resolution.

Canny, John. "A computational approach to edge detection". Pattern Analysis and Machine Intelligence, IEEE Transactions on Nov. 6, 1986, pp. 679-698.

Martin, David R., Charless C. Fowlkes, and Jitendra Malik. "Learning to detect natural image boundaries using local brightness, color, and texture cues". Pattern Analysis and Machine Intelligence, IEEE Transactions on 26.5, May 2004, pp. 530-549.

* cited by examiner

METHOD, SYSTEM AND APPARATUS FOR DETERMINING A CONTOUR SEGMENT FOR AN OBJECT IN AN IMAGE CAPTURED BY A CAMERA

REFERENCE TO RELATED PATENT APPLICATION(S)

This application claims the benefit under 35 U.S.C. §119 of the filing date of Australian Patent Application No. 2013245477, filed 16 Oct. 2013, hereby incorporated by reference in its entirety as if fully set forth herein.

FIELD OF INVENTION

The current invention relates generally to image and video processing and, in particular, to local image feature determination for image representation and object recognition. The present invention also relates to a method and apparatus for determining a contour segment for an object in an image captured by a camera, and to a computer program product including a computer readable medium having recorded thereon a computer program for determining a contour segment for an object in an image captured by a camera.

DESCRIPTION OF BACKGROUND ART

Some approaches for visual object recognition have been based on local image features and descriptors that allow fast determination of (or "extraction of") and matching of image features while maintaining high discriminative properties. There are three main categories of local image features: corner points, regions (or "blobs"), and edges.

Corner points are image locations of high curvature, for example, where a corresponding image gradient exhibits a large change in both horizontal and vertical directions. One method of determining corner features in an image is known as "Harris Corners".

Regions (or "blobs") are another common type of local image feature. Regions may be detected in an image either via examining the properties of the Hessian matrix at each pixel of the image or by applying over-segmentation techniques. One method of detecting regions in an image is known as the Scale Invariant Feature Transform (SIFT). Another region based method of determining image features in an image is known as super-pixel segmentation.

Methods of determining image features in an image based on corners and regions are not descriptive enough for object detection and object class recognition, and are not amenable to learning of temporal shape models and parametric representations for straightforward manipulation under geometric transformation.

The third type of image features is referred to as the edge feature. Edges (straight lines) and contours or contour segments (curve lines) are defined as a collection of edgels that satisfy a 4 or 8-neighbour spatial connectivity constraint. An edgel is an image pixel with a gradient magnitude larger than a given threshold value. Edgels can be determined efficiently using convolution masks.

One edgel detection method uses an algorithm known as the "Canny detector" algorithm. The Canny detector algorithm produces a binary image as output. After edgels on an input image are determined, edges are determined by fitting lines between edgels. Connecting edgels to form lines is known as "Edge Linking". A disadvantage of the Canny detector method is the sensitivity of the Canny detector algorithm to image noise and external factors. An example of an external factor is a camera's automatic gain control causing image brightness to continuously change, giving rise to different features lacking any invariance properties that would be necessary for developing a reliable object recognition system. Lack of robustness to image noise results in the Canny detector algorithm not being suitable for use in applications that require tracking.

One method of determining contours in an image is to first perform image segmentation or invariant region detection to determine the main structures in an image. A silhouette of each found region is then determined as a single contour or as a collection of contour fragments. Images may be first segmented into regions using an algorithm known as the Watershed algorithm, and then line segments are fitted to edges in the outline of the regions. Similarly, in another method of determining contours in an image Maximally-stable extremal regions (MSER) may be detected in the image and then a silhouette determined for each of the regions. Such methods of determining contours in an image are suitable for modelling objects of uniform colour or image regions of uniform intensity of limited spatial extend. However, such methods of determining contours in an image are not as suitable for objects that do not exhibit such characteristics, such as the objects often encountered in surveillance videos. Furthermore, the above described method of determining contours in an image is not suitable for object recognition by parts.

One method of determining image features in an image specifically tunes the Canny detector algorithm for object boundary detection. The tuned Canny detector algorithm method generates a probability at each pixel that the pixel belongs to an object boundary. Edgel detection is posed and solved as a supervised learning problem given a large collection of images segmented by human subjects. A small set of local image features including local brightness, texture, and colour, are evaluated for every pixel and a local neighbourhood of the pixel and statistically combined to determine the probability that each of the pixels belong to an object boundary. A threshold can be applied to this edgel probability image to generate a binary image. Edge linking can be used on the edgel probability image for contour segment determination similar to the Canny detection approach mentioned earlier. The tuned Canny detector algorithm method has also been extended to add a global constraint on boundary detection, making the tuned Canny detector algorithm method more robust to clutter and further improving performance. The main disadvantages of the tuned Canny detector algorithm method is the requirement for offline training with a large collection of human segmented data, and the large computational cost for detection, which may be several minutes for a high resolution image.

Another method of determining image features in an image is referred to as "edge drawing" (ED). It is called edge drawing because the method can be thought of as sketching the edges in an image by connecting two pixels that belong to the edge (i.e., like playing the children's game "connect the dots"). The main disadvantage of the edge drawing method is that dominant edges determined from a single image do not possess robustness properties with respect to photometric and geometric image transformations.

SUMMARY OF THE INVENTION

It is an object of the present invention to substantially overcome, or at least ameliorate, one or more disadvantages of existing arrangements.

Disclosed are arrangements which may be used for determining a local image feature and are suitable for both specific object and object class recognition. The disclosed arrangements are also suitable for object recognition by parts and are amenable for learning temporal shape models. The disclosed arrangements allow straightforward manipulation under geometric transformation and are robust to image noise. In addition, the determined local image features are suitable for modelling objects and image regions of non-uniform intensity and colour, and are particularly advantageous for use in surveillance videos. The determined local image features do not require offline training and possess robustness properties with respect to photometric and geometric image transformation.

According to one aspect of the present disclosure there is provided a method of determining a contour segment for an object in an image captured by a camera, said method comprising:

determining a plurality of corner points located on a part of an object in the image;

selecting pairs of corner points from the determined corner points;

determining a path for at least one of the pairs of corner points, the path connecting the corner points of the at least one pair of corner points along the boundary of the object; and determining the contour segment for the object using the determined path.

According to another aspect of the present disclosure there is provided an apparatus for determining a contour segment for an object in an image captured by a camera, said apparatus comprising:

module for determining a plurality of corner points located on a part of an object in the image;

module for selecting pairs of corner points from the determined corner points;

module for determining a path for at least one of the pairs of corner points, the path connecting the corner points of the at least one pair of corner points along the boundary of the object; and module for determining the contour segment for the object using the determined path.

According to still another aspect of the present disclosure there is provided a system for determining a contour segment for an object in an image captured by a camera, said system comprising:

a memory for storing data and a computer program; and a processor coupled to said memory for executing said computer program, said computer program comprising instructions for:

determining a plurality of corner points located on a part of an object in the image;

selecting pairs of corner points from the determined corner points;

determining a path for at least one of the pairs of corner points, the path connecting the corner points of the at least one pair of corner points along the boundary of the object; and determining the contour segment for the object using the determined path.

According to still another aspect of the present disclosure there is provided A computer readable medium comprising a computer program for determining a contour segment for an object in an image captured by a camera, said program comprising:

code for determining a plurality of corner points located on a part of an object in the image;

code for selecting pairs of corner points from the determined corner points;

code for determining a path for at least one of the pairs of corner points, the path connecting the corner points of the at least one pair of corner points along the boundary of the object; and code for determining the contour segment for the object using the determined path.

Other aspects of the invention are also disclosed.

BRIEF DESCRIPTION OF THE DRAWINGS

One or more embodiments of the invention will now be described with reference to the following drawings, in which.

DETAILED DESCRIPTION INCLUDING BEST MODE

Figure 1A:
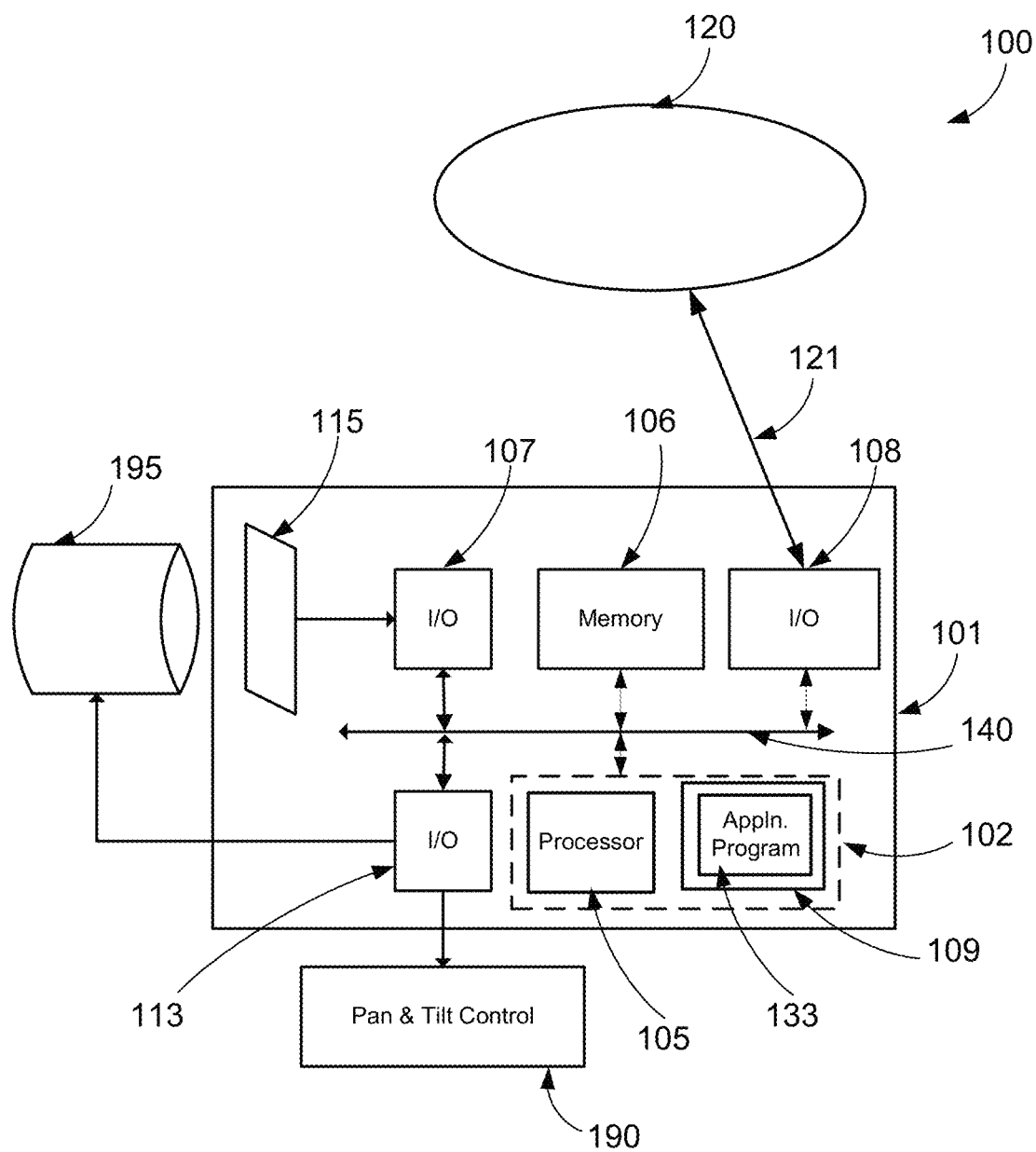
FIGS. 1A and 1B form a schematic block diagram of a camera, upon which described methods may be practiced.

Where reference is made in any one or more of the accompanying drawings to steps and/or features, which have the same reference numerals, those steps and/or features have for the purposes of this description the same function(s) or operation(s), unless the contrary intention appears.

Figure 1B:
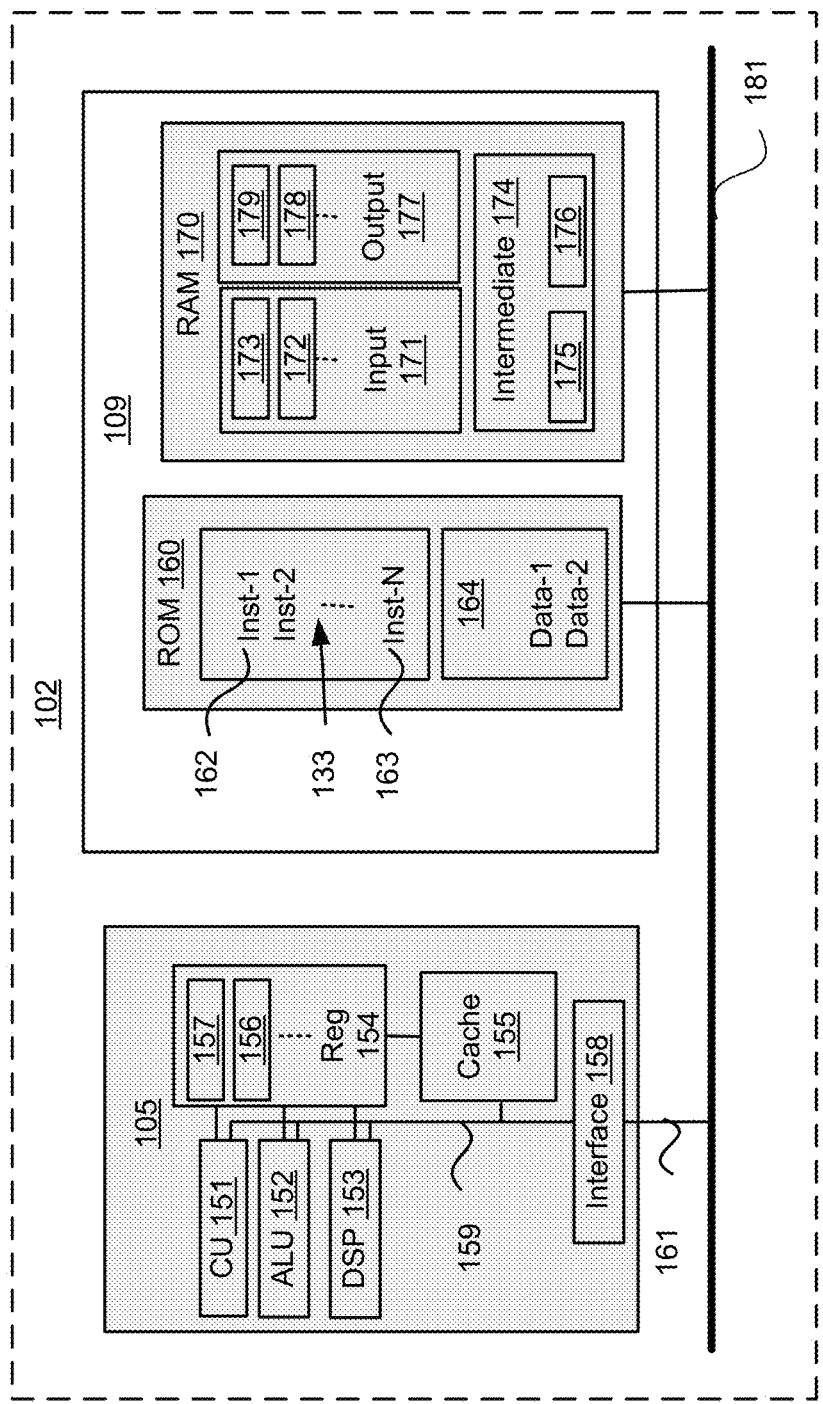

FIGS. 1A and 1B are a schematic block diagram of a camera 100, upon which described methods may be practiced. The camera 100 is a pan-tilt-zoom camera (PTZ). The camera 100 comprises a camera module 101, a pan and tilt module 103, and a lens system 195.

As seen in FIG. 1A, the camera module 101 comprises an embedded controller 102. In the present example, the embedded controller 102 includes at least one processor unit 105 (or processor) which is bi-directionally coupled to an internal storage module 109. The storage module 109 may be formed from non-volatile semiconductor read only memory (ROM) 160 and semiconductor random access memory (RAM) 170, as seen in FIG. 1B. The RAM 170 may be volatile, non-volatile or a combination of volatile and non-volatile memory.

As seen in FIG. 1A, the camera module 101 also comprises a portable memory interface 106 which is coupled to the processor 105. The portable memory interface 106 allows a complementary portable memory device to be coupled to the camera module 101 to act as a source or destination of data or to supplement the internal storage module 109. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The camera module 101 also comprises an input/output (I/O) interface 107 that couples to a photo-sensitive sensor array 115.

The camera module 101 also comprises a communications input/output (I/O) interface 108 that couples to a communications network 120 via a connection 121. The connection 121 may be wired or wireless. For example, the connection 121 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

The camera module 101 also comprises an I/O interface 113 for the pan and tilt module 109 and the lens system 195.

The components, which include the sensor I/O interface 107, embedded controller 102, communications I/O interface 108, control interface 113 and memory interface 106 of the camera module 101, typically communicate via an interconnected bus 140 and in a manner which results in a conventional mode of operation known to those in the relevant art.

The described methods may be implemented using the embedded controller 102, where the processes of FIGS. 2 to 12B may be implemented as one or more software application programs 133 executable within the embedded controller 102. The camera module 101 of FIG. 1A implements the described methods. In particular, with reference to FIG. 1B, the steps of the described methods are effected by instructions in the software 133 that are carried out within the controller 102. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 133 of the embedded controller 102 is typically stored in the non-volatile ROM 160 of the internal storage module 109. The software 133 stored in the ROM 160 can be updated when required from a computer readable medium. The software 133 can be loaded into and executed by the processor 105. In some instances, the processor 105 may execute software instructions that are located in RAM 170. Software instructions may be loaded into the RAM 170 by the processor 105 initiating a copy of one or more code modules from ROM 160 into RAM 170. Alternatively, the software instructions of one or more code modules may be pre-installed in a non-volatile region of RAM 170 by a manufacturer. After one or more code modules have been located in RAM 170, the processor 105 may execute software instructions of the one or more code modules.

The application program 133 is typically pre-installed and stored in the ROM 160 by a manufacturer, prior to distribution of the camera module 101. However, in some instances, the application programs 133 may be supplied to the user encoded on one or more CD-ROM (not shown) and read via the portable memory interface 106 of FIG. 1A prior to storage in the internal storage module 109 or in the portable memory as described above. In another alternative, the software application program 133 may be read by the processor 105 from the network 120, or loaded into the controller 102 or such portable storage medium from other computer readable media. Computer readable storage media refers to any non-transitory tangible storage medium that participates in providing instructions and/or data to the controller 102 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the camera module 101. Examples of transitory or non-tangible computer readable transmission media that may also participate in the provision of software, application programs, instructions and/or data to the camera module 101 include radio or infra-red transmission channels as well as a network connection to another computer or networked device, and the Internet or Intranets including e-mail transmissions and information recorded on Websites and the like. A computer readable medium having such software or computer program recorded on it is a computer program product.

FIG. 1B illustrates in detail the embedded controller 102 having the processor 105 for executing the application programs 133 and the internal storage 109. The internal storage 109 comprises read only memory (ROM) 160 and random access memory (RAM) 170. The processor 105 is able to execute the application programs 133 stored in one or both of the connected memories 160 and 170. When the camera module 101 is initially powered up, a system program resident in the ROM 160 is executed. The application program 133 permanently stored in the ROM 160 is sometimes referred to as "firmware". Execution of the firmware by the processor 105 may fulfil various functions, including processor management, memory management, device management, storage management and user interface.

The processor 105 typically includes a number of functional modules including a control unit (CU) 151, an arithmetic logic unit (ALU) 152, a digital signal processing (DSP) unit 153 and a local or internal memory comprising a set of registers 154 which typically contain atomic data elements 156, 157, along with internal buffer or cache memory 155. One or more internal buses 159 interconnect these functional modules. The processor 105 typically also has one or more interfaces 158 for communicating with external devices via system bus 181, using a connection 161.

The application program 133 includes a sequence of instructions 162 through 163 that may include conditional branch and loop instructions. The program 133 may also include data, which is used in execution of the program 133. This data may be stored as part of the instruction or in a separate location 164 within the ROM 160 or RAM 170.

In general, the processor 105 is given a set of instructions, which are executed therein. This set of instructions may be organised into blocks, which perform specific tasks or handle specific events that occur in the camera module 101. Typically, the application program 133 waits for events and subsequently executes the block of code associated with that event. Events may be triggered in response to input from the interfaces 107, 108 and 113 of the camera module 101.

The execution of a set of the instructions may require numeric variables to be read and modified. Such numeric variables are stored in the RAM 170. The described methods use input variables 171 that are stored in known locations 172, 173 in the memory 170. The input variables 171 are processed to produce output variables 177 that are stored in known locations 178, 179 in the memory 170. Intermediate variables 174 may be stored in additional memory locations in locations 175, 176 of the memory 170. Alternatively, some intermediate variables may only exist in the registers 154 of the processor 105.

The execution of a sequence of instructions is achieved in the processor 105 by repeated application of a fetch-execute cycle. The control unit 151 of the processor 105 maintains a register called the program counter, which contains the address in ROM 160 or RAM 170 of the next instruction to be executed. At the start of the fetch execute cycle, the contents of the memory address indexed by the program counter is loaded into the control unit 151. The instruction thus loaded controls the subsequent operation of the processor 105, causing for example, data to be loaded from ROM memory 160 into processor registers 154, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 133, and is performed by repeated execution of a fetch-execute cycle in the processor 105 or similar programmatic operation of other independent processor blocks in the camera module 101. The camera 100 may be used to capture input images representing the visual content of a scene appearing in the field of view of the camera 100. The visual content may include one or more foreground objects and one or more background objects.

The camera 100 is used to capture video frames, also known as input images or input frames, representing visual content of a scene appearing in the field of view of the camera 100. The described methods may be configured for determining contour segments from the input images in sequence. Contour segments may also be referred to as Geodesic Active-based Contour (GAbC) features. Although the camera 100 is described as a PTZ camera, the described methods may be implemented as a computer program executing on any type of camera including for example static field-of-view cameras, PTZ cameras, wearable cameras and handheld cameras.

Figure 2:
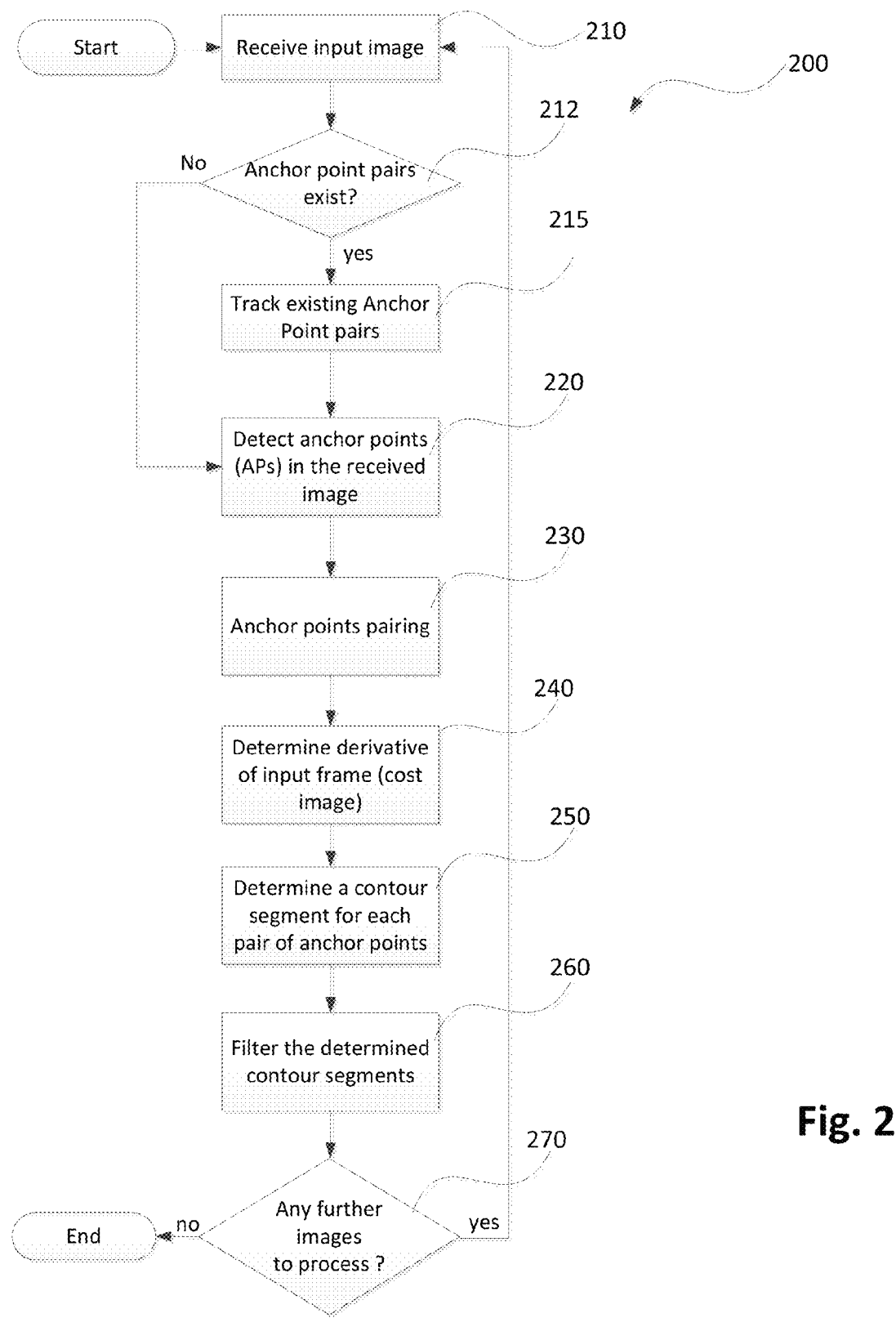
FIG. 2 is a flow diagram showing a method of determining contour features for an image.

FIG. 2 is a schematic flow diagram showing a method of determining contour (i.e., GAbC) segments (or features) from a received input image. The method 200 may be implemented as one or more code modules of the software application program 133 resident in the storage module 109 of the camera 100 and being controlled in its execution by the processor 105.

The method 200 begins at image receiving step 210, where an input image captured by the camera 100 is received by the processor 105. The image may be received at step 210 from the storage module 109. For example, the image may have been captured by the camera 100 and stored within the RAM 170 of the storage module 109 prior to execution of the method 200.

Then at decision step 212, the processor 105 is used to determine if there are existing anchor point pairs stored in RAM 170. The existing anchor point pair(s) may be stored in a list within RAM 170. Anchor points will be described below.

If there are no anchor point pairs in RAM 170 at step 212, then the method 200 moves to determining step 220 to determine anchor points. Otherwise, the method 200 proceeds to tracking step 215. At the determining step 220, the processor 105 is used to determine anchor points in the received image. Anchor points are image locations of high curvature, such as points in the image where the image gradient exhibits a large change in both the horizontal and vertical directions. Anchor points may also be referred to as "corner points".

As described below with reference to FIG. 8, a plurality of anchor points located on a part of an object in the received image may be determined at step 220, with each of the anchor points representing a change in direction of an image gradient corresponding to a boundary of such an object. In one arrangement, the anchor points may be determined using a corner detector and may be referred to as corners as described above.

In one arrangement, the Harris-Corner corner detection algorithm is used to determine anchor points at step 220, where each of the anchor points corresponds to a corner as defined above. Harris Corners exhibit many desired properties to be used for object detection and recognition in video frames (or "video images") such as reliability for redetection, computational speed, and good localisation at sub-pixel resolution.

After determining anchor points in the image at step 220, in one arrangement non-maxima suppression is applied to the anchor points to limit the number of anchor points in highly textured image regions. A non-maxima suppression distance threshold may be set to twenty (20) pixels for the non-maxima suppression. All available anchor points (or corners) in the input image are determined at step 220.

Referring back to step 212, if there are existing anchor point pair(s) stored in RAM 170, then the method 200 proceeds to from step 212 to step 215, which tracks the existing anchor point pairs. A method 1100 of tracking anchor point pairs, as executed at step 215, will be described in detail below with reference to FIG. 11.

Following step 220, the method 200 continues at step 230, where the processor 205 is used for selecting pairs of the anchor points to connect, also referred to as the "pairing process" or "anchor point pairing process". The pairs of anchor points (or "anchor point pairs") are selected from the anchor points determined at step 220. As described below, anchor points may be connected based on a distance between the anchor points. In one arrangement, the anchor points in each of the selected anchor point pairs are within a predetermined distance on an object in the image.

After the anchor point pairing step 230, the method 200 continues to determining step 240, where the processor 105 is used to determine the derivative of the input image received at step 210. The derivative of an image, also referred to as the "cost image", provides an indication of where strong edges lie in the input image. Cost image information is useful for both contour determination and the contour filtering as described in detail below with reference to steps 250 and 260, respectively. A method 900 of determining a derivative of an image, as executed at step 240, will be described in detail below with reference to FIG. 9.

Then following step 240, the method 200 proceeds to step 250, where the processor 105 is used for determining a contour segment for each pair of anchor points. Each determined contour segment may be referred to below as a "determined contour". A method 400 of determining a contour segment for a pair of anchor points, as executed at step 250, will be described in detail below with reference to FIG. 4. The method 400 may be used in determining a contour segment for an object in the input image. The contour segment may be determined based on a path (or paths) determined for a least one pair of anchor points (or anchor point pair), the path connecting the anchor points of the at least one pair of anchor points along the boundary of the object in the input image. As also described, the path may be determined using an energy function of an image gradient magnitude and path length. The contour segment is determined for the object using one or more of the determined paths. The determined path and one or more further paths determined for the object in the input image, may be used for representing the object if the determined path and the one or more further paths overlap each other.

After all contour segments are determined for the image at step 250, the method 200 proceeds to contour filter step 260 where the determined contour segments are filtered as described below. Filtering of contour segments is not necessary if all contour segments determined at step 250 uniquely lie on an edge. However, in practice, contour segments determined at step 250 may exhibit undesired properties. For example, a contour segment may go through a flat texture area of the image, which is known as high cost. Contour segments may also overlap with each other, which is known as duplication. Further, contour segments may exhibit both high cost and duplication. A method 500 of filtering contour segments, as executed at step 260, will be described in detail below with reference to FIG. 5.

After the contour filtering step 260, the method 500 proceeds to step 270, where the processor 105 is used to check if the last image in an input frame sequence has been processed. If there are more images to be processed, then the method 200 returns to step 210. Otherwise, the method concludes.

Figure 11:
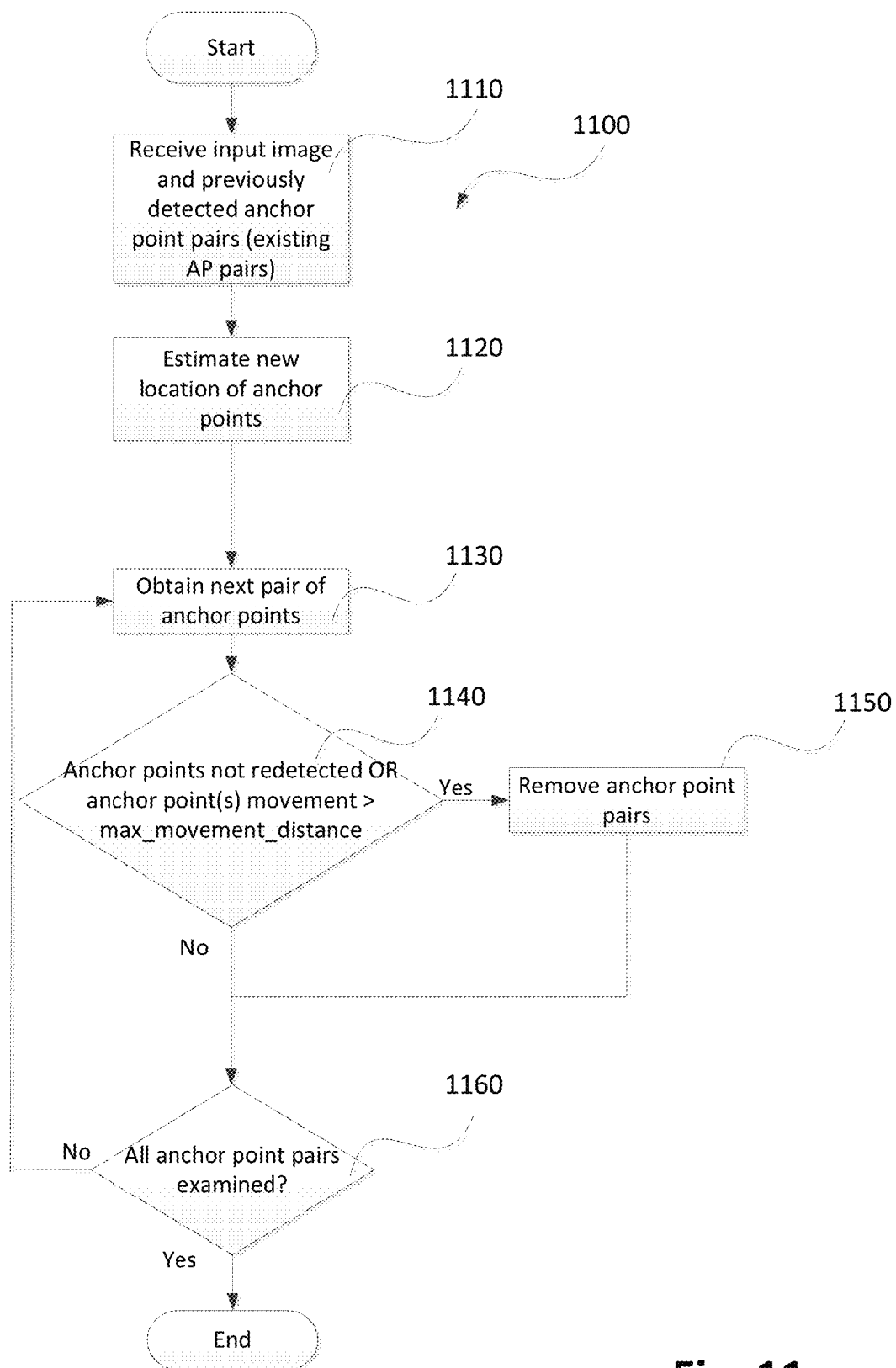
FIG. 11 a flow diagram showing a method of tracking anchor point pairs.

The method 1100 of tracking anchor point pairs, as executed at step 215, will now be described with reference to FIG. 11. The method 1100 may be implemented as one or more code modules of the software application program 133 resident in the storage module 109 of the camera 100 and being controlled in its execution by the processor 105.

The method 1100 begins at receiving step 1110, where the current input image and the existing anchor point pairs list (i.e., stored within the list within RAM 170) is received using the processor 105. The existing anchor point pairs list includes identification information about a plurality of pairs of anchor points in a previous frame and each location of the plurality of pairs of anchor points in the previous frame. Each path between each pair of anchor points does not have to be stored.

Then at step 1120, new locations of each of the existing anchor points in the existing anchor point pairs list are estimated. The anchor points are searched and re-detected (tracked) in the current input image to estimate the new locations. In one arrangement, the Lucas-Kanade optical flow estimation method may be used for estimating the new locations of the anchor points at step 1120.

The method 1100 then proceeds from step 1120 to obtaining step 1130 where the processor 105 is used to obtain a next anchor point pair from existing anchor point pairs list stored in RAM 170. Next, the method 1100 proceeds to step 1140, where the processor 105 is used to examine the pair of anchor points obtained at step 1130 based on two conditions. First, the processor 105 is used at step 1140 to determine if any of the anchor points of the pair can be determined again (or "re-detected") in the current input frame. Second, the processor 105 is used at step 1140 to determine if any of the re-detected anchor points have moved and whether the distance of movement from the location in the previous input frame is greater than the maximum movement distance. In one arrangement, the maximum movement distance is set to twenty (20) pixels. If at least one of the anchor point pair cannot be determined again (i.e., re-detected/tracked), or any of the tracked anchor points moved more than the maximum movement distance, then the method 1100 proceeds to removing step 1150. Otherwise, the method 1100 proceeds to step 1160. At step 1150, the anchor point pair obtained at step 1120 is removed from the anchor point pair list configured within RAM 170.

At step 1140, if the anchor points in the anchor point pair obtained at step 1130 are determined again (or re-detected) in the current input image, and the movement of both the anchor points of the pair from the location in the previous input frame is less than or equal to the maximum distance, then the method 1100 proceeds to step 1160. At step 1160, if all anchor point pairs have been examined then the method 1100 concludes. Otherwise, if more anchor point pairs need to be examined, the method 1100 loops back to step 1130 to process the next anchor point pair. Following step 1160, the method 1100 concludes.

Tracking of existing anchor point pairs in video images is advantageous since most of the background anchor points stay at the same location. When a pair of anchor points stays at the same locations in a subsequent image as in a previous image, the contour segment between the two anchor points typically stays the same. Assuming that the contour segment between the two anchor points typically stays the same allows the system 100 not to waste time repeating the same search trying to connect the same anchor point pair in subsequent consecutive images (or frames), resulting in more efficient processing time. For this reason, at step 220, the processor 105 is used for determining whether the anchor points are "new" anchor points or occurred in a previous video frame. Any determined anchor points that are also in the existing anchor point pair list are removed so that the list represents only the "new" anchor points and only the new anchor points are processed for all later steps of the method 200. For simplicity, the "new" anchor points are simply referred to as anchor points below.

Figure 3:
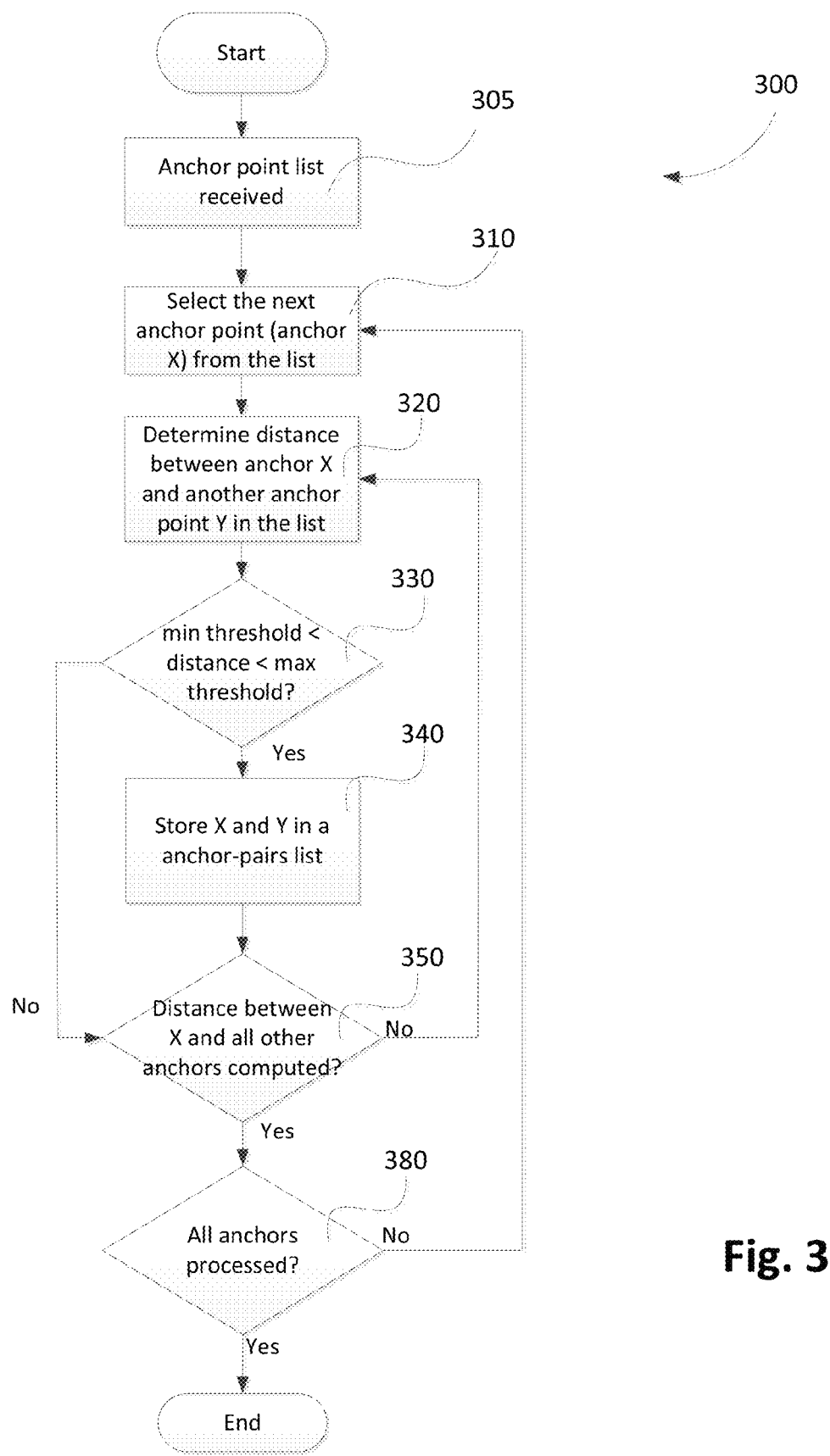
FIG. 3 is a flow diagram showing a method of pairing anchor points.

The method 300 of pairing anchor points (i.e., determining pairs of anchor points), as executed at step 230, will be described in detail below with reference to FIG. 3. The method 300 may be implemented as one or more code modules of the software application program 133 resident in the storage module 109 of the camera 100 and being controlled in its execution by the processor 105.

The method 300 begins at step 305, where the processor 105 is used to retrieve the list of newly determined anchor points from RAM 170. Then the method 300 proceeds to step 310 where the processor 105 is used to select an anchor point 'X' from the list retrieved at step 305.

Then at step 320, the processor 105 is used to determine the distance between anchor point 'X' and another anchor point 'Y' in the list newly determined anchor points. In one arrangement, the anchor 'Y' is selected at step 320 based on the following conditions: anchor point 'Y' is not the same as anchor point 'X'; and the distance between anchor point 'X' and 'Y' has not been determined prior to step 310 for the current input image.

Then the method 300 proceeds to the pairing condition determining step 330, where the processor 105 is used to first compare the resulting distance value with a predefined minimum threshold value (e.g.; 50 pixels), and a predefined maximum threshold value (eg: 200 pixels). If the resulting distance value is between the minimum and maximum threshold values at step 330, then the method 300 proceeds to step 340. At step 340, the processor 105 is used to store anchor points 'X' and 'Y' as a pair of anchor points in an anchor-pairs list configured within the RAM 170, where anchor point 'X' is referred to as start point and anchor point 'Y' is referred to as end point. Determining step 330 may be referred to as the "pairing condition".

At the pairing condition determining step 330, if the resulting distance value is outside of the minimum and maximum threshold values range, then the method 300 proceeds to another distance computing determining step 350. At the distance computing determining step 350, the processor 105 is used to determine if the distances between anchor point 'X' and all other anchor points have been determined. If the distances between anchor point 'X' and all other anchor points have been determined, then the method 300 loops back to step 320 where the processor 105 is used to select a new anchor point 'Y' and determine the distance between anchor point 'X' and new anchor point 'Y'. If the distances between anchor point 'X' and all other anchor points in the anchor point list are determined, the method 300 proceeds to pairing condition termination determining step 380.

At pairing condition termination determining step 380, the processor 105 is used to check if all anchor points are processed in regard to determining the pairs of anchor points. If there are more anchor points needed to be checked for the pairing condition, then the method 300 returns back to selecting step 310. If all anchor points in the anchor list received at step 305 are checked by the method 300, then the method 300 terminates. As well as the pairing process the method 300 may also be referred to as "anchor point pairing".

Figure 9:
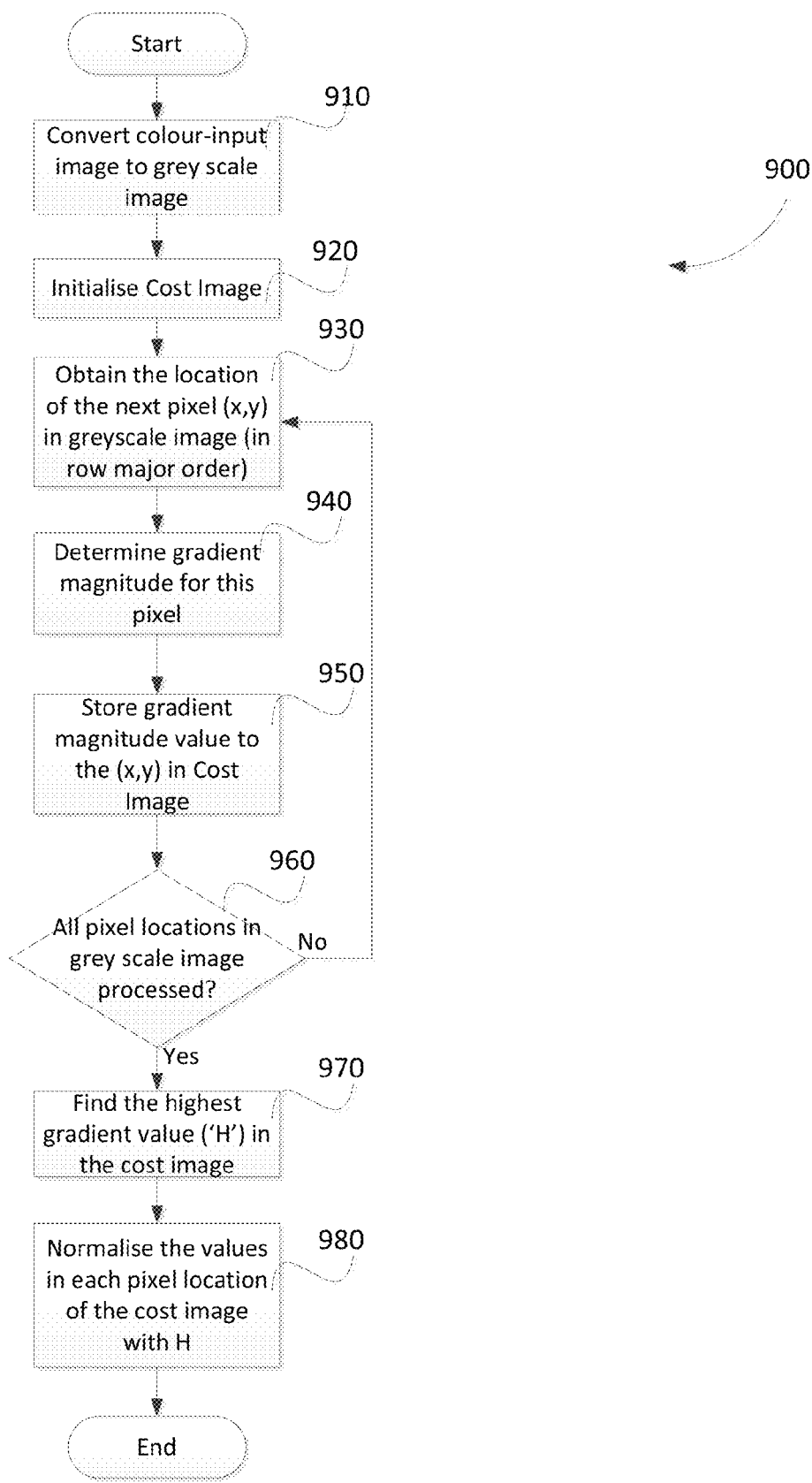
FIG. 9 is a flow diagram showing a method of determining a derivative of an image.

The method 900 of determining a derivative of an image (i.e., the cost image), as executed at step 240, will described in detail below with reference to FIG. 9. The method 900 may be implemented as one or more code modules of the software application program 133 resident in the storage module 109 of the camera 100 and being controlled in its execution by the processor 105. The method 900 begins at converting step 910, where the input image received at step 210 is converted from a colour image to a greyscale image, assuming that when the sensor 115 in the camera 100 captures the input image, the image contains multiple colour channels (i.e., the received image is a colour image). If the input image is in greyscale already, converting step 910 is skipped. The greyscale image may be stored in the RAM 170.

At initialising step 920, a cost image data structure is initialised within RAM 170. The cost image data structure is initialised to be the same resolution as the input image. For example, if the input image has a resolution of one thousand nine hundred and twenty (1920) pixels in width and one thousand and eighty (1080) pixels in height, the cost image data structure is initialised to be one thousand nine hundred and twenty (1920) by one thousand and eighty (1080) pixels. The cost image data structure will be referred to below as "the cost image" for purposes of the description.

Next, the method 900 proceeds to obtaining step 930. At obtaining step 930, the processor 105 is used to obtain the next pixel location (x,y), in row major order from the greyscale image determined at step 910. Then, at step 940, the gradient magnitude of pixel (x,y) is determined under execution of the processor 105. Next, at storing step 950, the value of the determined gradient magnitude is stored at a pixel location in the cost image that corresponds to the same (x,y) pixel location in the input image.

The method 900 then proceeds through to decision step 960, where the processor 105 is used to check if all pixels in the greyscale image are processed. If there are more pixels to be processed, then the method 900 loops back to step 930. Otherwise, the method 900 proceeds to determining step 970.

At step 970, the processor 105 is used to find the highest gradient value, H, in the cost image. After the highest gradient value (H) is found, the method 900 moves to normalising step 980 where every gradient value in the cost image is normalised with the highest gradient value (H). Normalising every gradient value in the cost image ensures all the values in the cost image are in the value range [0 to 1]. In one arrangement, the normalisation equation, Equation (1), below, is used to normalise values in the cost image at step 980:

$$V_i = \begin{cases} 0, & \text{if } H = 0 \\ \dfrac{G_i}{H}, & \text{if } H > 0 \end{cases} \quad (1)$$

where $V_i$ is the value of the $i^{th}$ pixel on the image, and $0 \leq i <$ total number of pixels. When the highest gradient value (H) is zero (0), all values in the cost image are set to zero (0), and when H>0, each gradient value $G_i$ at the $i^{th}$ pixel divided by the highest gradient value (H) yields the cost $V_i$.

Figure 4:
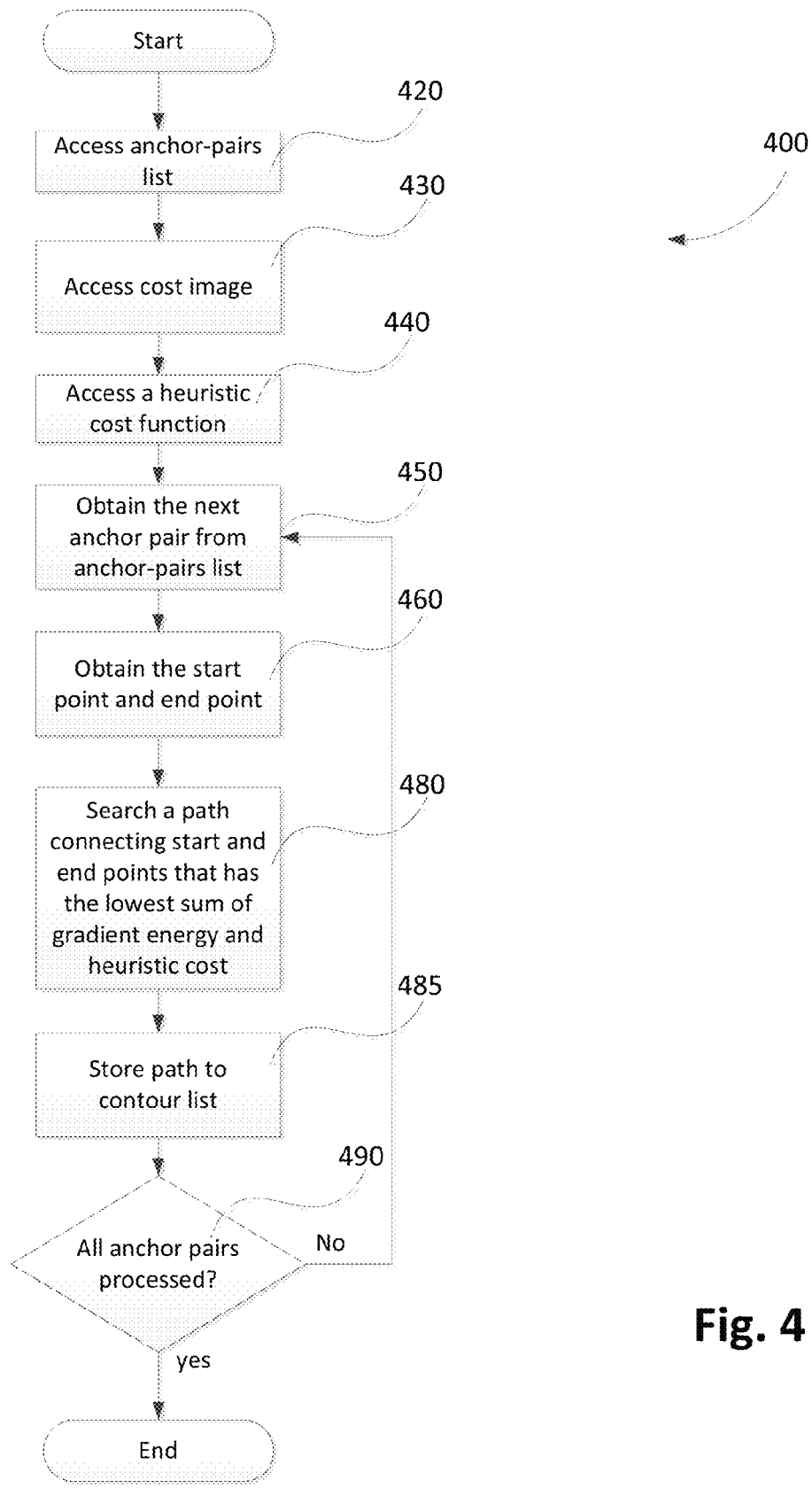
FIG. 4 is a flow diagram showing a method of determining a contour segment for a pair of anchor points.

The method 400 of determining a contour segment for a pair of anchor points, as executed at step 250, will be described in detail below with reference to FIG. 4. As described here, the method 400 is executed for the input image captured by the camera 100 and received at step 210.

The method 400 may be implemented as one or more code modules of the software application program 133 resident in the storage module 109 of the camera 100 and being controlled in its execution by the processor 105.

The method 400 begins at accessing step 420, where the anchor-pairs list determined in step 340, is accessed in the RAM 170. Next, the method 400 moves to accessing step 430, in which the cost image is accessed from RAM 170 by the processor 105. Next the method 400 moves to accessing step 440, in which, a user defined heuristic cost function is accessed by the processor 105. In one arrangement, the heuristic cost function used at step 440 is admissible heuristic. The user defined heuristic cost function will be described in detail below.

Then the method 400 moves to a processing loop which begins at obtaining step 450, where the processor 105 is used to obtain the next anchor pairs from the anchor-pairs list configured within the RAM 170. Next, the start and end points are obtained from the anchor pairs at obtaining step 460.

Then at searching step 480, the processor 105 is used to search for a contour segment in the input image (i.e., as received at step 210) that connects both the start and end points, so that the contour segment starts at one of the anchor points of a pair of anchor points and ends at the other anchor point of the pair. Searching for the contour segment at step 480 may be implemented using a path finding method in graph search. A graph search method may be used to find a path that begins at the start anchor point and finishes at the end anchor point. In one arrangement, the input image received at step 210 may be considered as a graph in which adjacent pixels are connected. Start and end anchor points may be considered as two nodes in the graph and a path may be found between the two nodes.

In addition to finding any path between two anchor points, a constraint may be imposed that such a path must be the shortest (i.e. the lowest cost path between two anchor points). In one arrangement, if two or more paths have the same energy cost, the path must be the shortest path length, so that the overall cost of the path is minimised. In one arrangement, the A* search algorithm (or simply A*) may be used to find the shortest path for each pair of anchor points. When measuring the cost for each step A* takes, two sub-costs are necessary to be known: the past path cost and the future path cost. For example, if the search is at location 'X' in between start and end points, the past path cost then refers to the cost to get to 'X' from the start point. Future path cost refers to the cost to get to the end point from 'X'.

The user defined heuristic cost function, which was received at step 440, provides the measurement for the future path cost. The term future path cost may also be referred to as cost-to-goal. In one arrangement, the user defined heuristic cost function is set to measure the Euclidean distance between 'X' and the end point. In another arrangement, the user defined cost function is set to measure the Manhattan distance between 'X' and the end point. The choice of a heuristic function should strike a balance between computational efficiency and memory requirement.

The cost image provides a value for determining the past path cost. In one arrangement, Equation (2) below is used, as the energy function, for determining the cost given the derivative of an image.

$$c(n) = (1.0 - |dI(n)|)^m \quad (2)$$

where c(n) is the cost to get to node 'n' from an adjacent node, and |dI(n)| is the absolute gradient magnitude value in the derivative of the input image whose value has been normalised between [0,1]. Moreover, 'm' is a positive number (e.g., three (3)).

Collectively, the energy function equation (i.e., Equation 2) above guides the path finding to follow strong edges in the input image and tries to avoid cutting through regions of uniform texture. Equation 2 guides the path finding since the equation fragment $(1.0-|dI(n)|)^m$ results in a relatively small value for the pixels which lie within an edge and a large value where flat surfaces are present.

After the shortest path, which represents a contour segment, is found between a pair of anchor points, the contour segment is stored in a contour segment list configured within RAM 170 at storing step 485.

At checking step 490, the processor 105 is used to check if all anchor pairs are processed. If more anchor points need to be connected, the method 400 loops back to step 450. Otherwise, the contour segment finding method 400 concludes. The A* algorithm is configured to find a path between start and end points, which is the lowest cost out of all possible paths between start and end points. However, it is possible that the lowest cost path goes through pixels which are in the flat texture area of the input image, which indicates that the particular contour segment does not trace an image contour very well. Such contour segments may be regarded as high cost contours.

Figure 5:
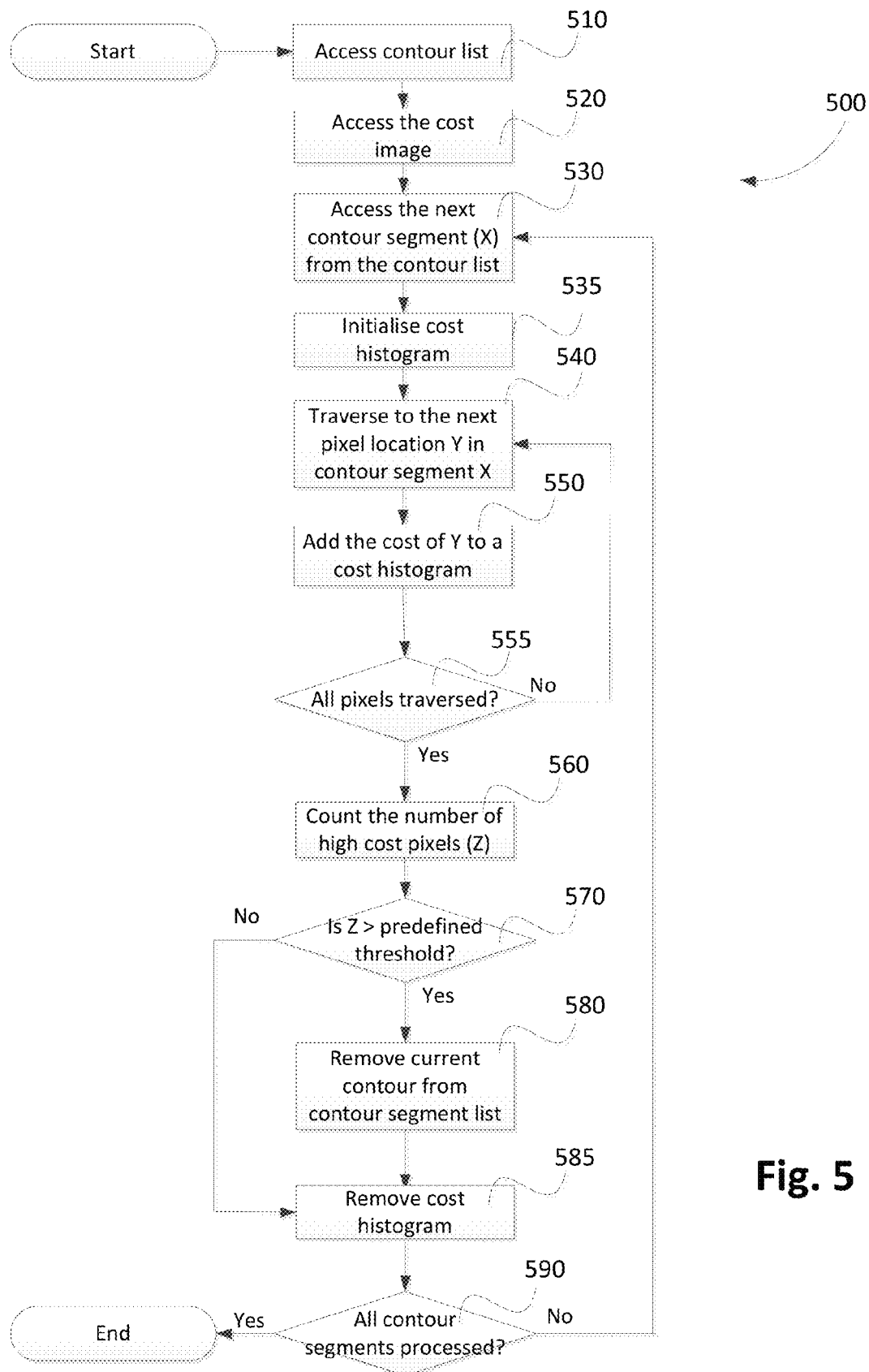
FIG. 5 is a flow diagram showing a method of filtering contour segments based on cost of contours.

The method 500 of filtering contour segments, as executed at step 260, will be described in detail below with reference to FIG. 5. The method 500 filters contour segments based on the cost. The filtering method 500 may also be referred to as the "filtering of high cost GAbCs".

The method 500 may be implemented as one or more code modules of the software application program 133 resident in the storage module 109 of the camera 100 and being controlled in its execution by the processor 105.

The method 500 begins at accessing step 510, where the list of contour segments are accessed from RAM 170 by the processor 105. Then at step 520, the cost image determined at step 240 is accessed by the processor 105 from RAM 170. Next, the method 500 proceeds to step 530. At step 530, the processor 105 is used to obtain a next contour segment 'X' from the contour segment list.

Then the method 500 moves to initialisation step 535 to initialise a cost histogram within RAM 170. The cost histogram may be used in determining whether a contour segment is a high cost contour segment. In one arrangement, the cost histogram is initialised with ten (10) bins, within which each bin holds one tenth of the value of the full spectrum of values in the cost image. For example, any pixel with a value in the cost image that is between zero (0) and 0.1 is added to the first bin in the cost histogram and pixels whose values are between 0.1 to 0.2 fall in the second bin in the cost histogram.

Then at traversing step 540, the processor 105 is used to traverse to the next pixel location 'Y' in contour segment 'X'. Then at adding step 550, the processor 105 is used to look up the gradient magnitude value 'Z' in the pixel location 'Y' in the cost image and added 'Z' to the appropriate bin in the cost histogram. Next the method 500 proceeds to decision step 555, where the processor 105 is used to examine if all pixels in contour segment 'X' have been traversed. If more pixels in contour segment 'X' need to be processed, then the method 500 loops back to step 540. If all pixels in contour segment 'X' are processed, (i.e. the cost histogram is built for contour segment 'X'), then the method 500 moves to step 560.

Pixels that are added to "high cost" bins are regarded as high cost pixels. At step 560, the number of pixels in "high cost" bins are counted, under execution of the processor 105. In one arrangement, the last three bins in the cost histogram, which stores pixels whose values are between 0.7 and 1.0 in the example, are regarded as high cost bins because empirical data shows that pixels with gradient magnitude value between 0.7 to 1.0 indicate flat texture surface in the input image.

Then at comparison step 570, the count of high cost pixels is compared to a predetermined threshold value (e.g., two (2)). If the high cost pixel count is greater than the predetermined threshold value, then the method 500 proceeds to the removing step 580. At step 580, the contour segment 'X' is removed from the contour segment list configured within RAM 170. Otherwise, the method 500 proceeds directly to step 585 where the cost histogram is removed under execution of the processor 105. In one arrangement, the predetermined threshold value is set to the number '2', which indicates that if there are more than two (2) high cost pixels in the contour segment 'X', then contour segment 'X' is removed from the contour list. In another arrangement, the predetermined value indicates a percentage value, say 10%, meaning that if a percentage of pixels in the contour segment 'X' are considered to be high cost, the corresponding contour segment is removed from the contour segment list. After the contour segment is removed from the contour segment list at step 580, the method 500 moves to step 585 where the cost histogram is removed from RAM 170 under execution of the processor 105.

At comparison step 570, if the high cost pixel count does not exceed a predetermined threshold, then the method 500 moves to step 585 to remove the cost histogram. After the cost histogram is removed, the method 500 moves to step 590 where the processor 105 is used to check if all contour segments in the contour segment list are processed. If more contour segments are to be processed, then the method 500 loops back to step 530. Otherwise, the method 500 concludes.

Figure 6:
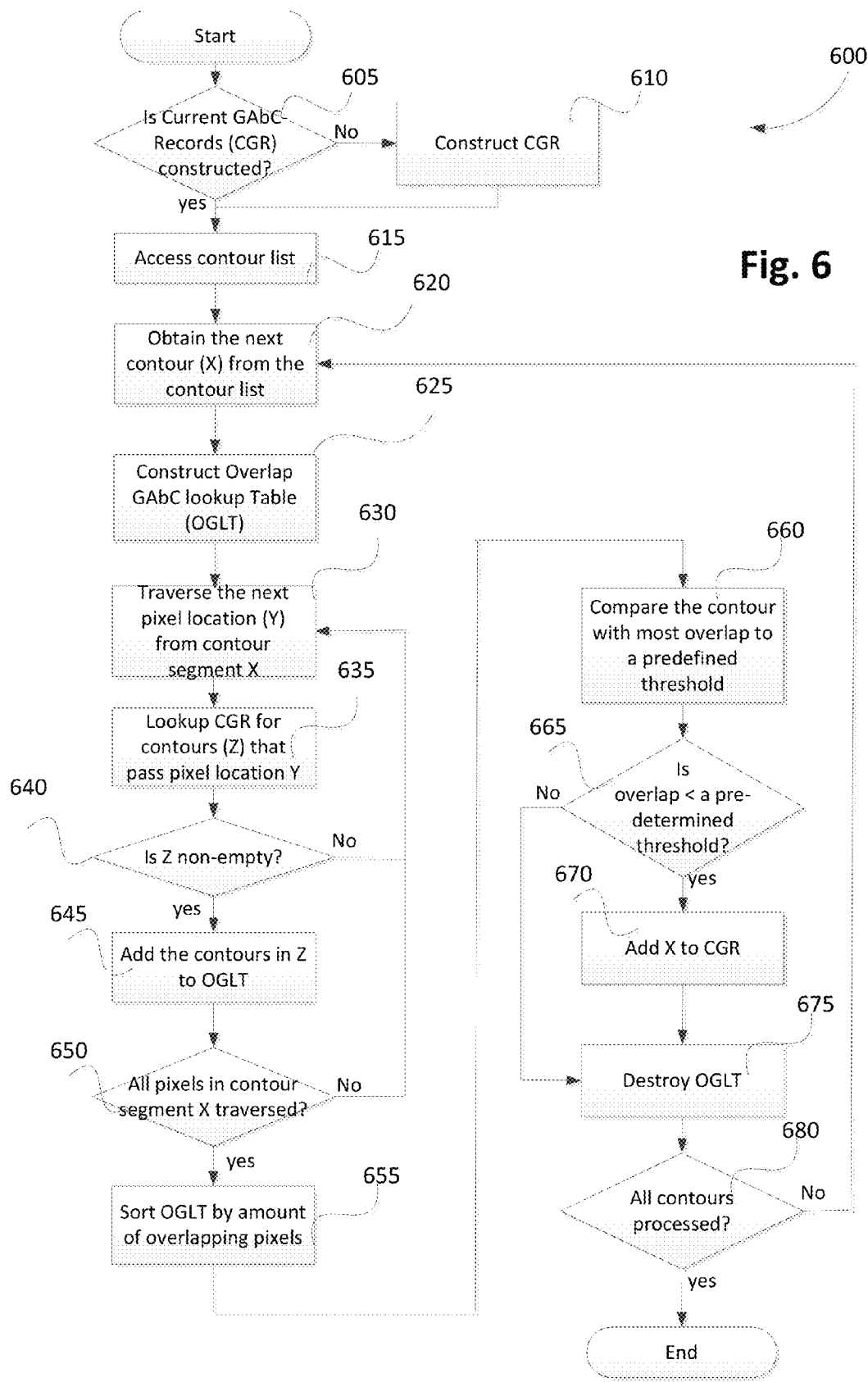
FIG. 6 is a flow diagram showing another method of filtering contour segments based on amount of overlap.

A method 600 of filtering contour segments, which may alternatively be executed at step 260, will now be described in detail below with reference to FIG. 6. The method 600 may be implemented as one or more code modules of the software application program 133 resident in the storage module 109 of the camera 100 and being controlled in its execution by the processor 105. The method 600 may be referred to as an overlap contour filtering process, and will be described by way of example with reference to FIG. 7.

The method 600 begins at checking step 605, where if a Current GAbC Records table, also known as a CGR table, is not yet constructed, the method 600 proceeds to step 610 to construct the CGR table. The CGR table may be implemented as a lookup table which stores all the unique contour segments determined up to a current frame. Unique contour segments, which may also be referred to as unique paths, are contour segments which do not overlap with each other. The processor 105 may be used for populating the CGR lookup table at step 610 with contour segments that do not overlap with other. As described below, the method 600 is configured for searching the CGR lookup table and selecting any contour segments overlapping a contour segment obtained from the contour segment list.

Figure 7:
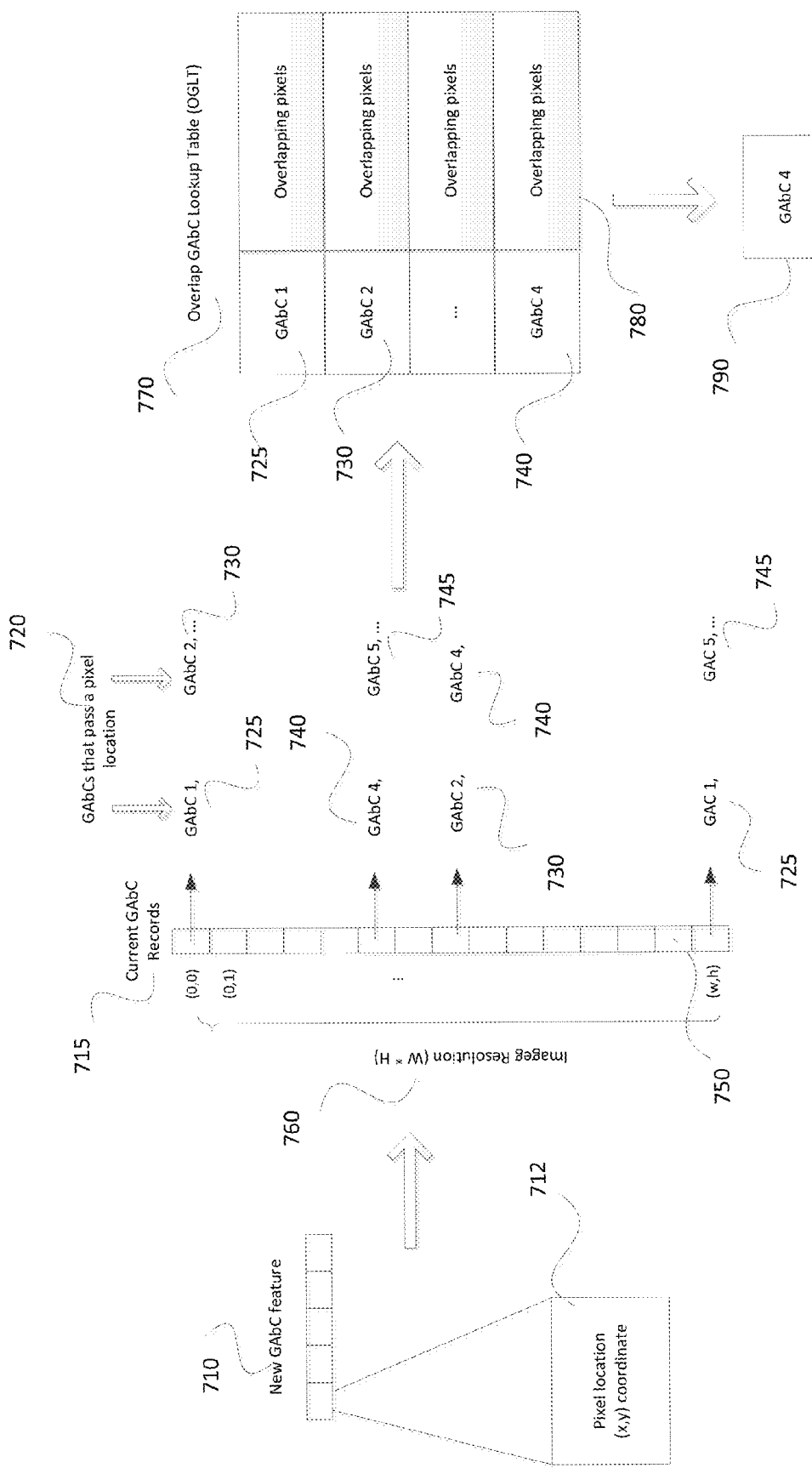
FIG. 7 a schematic diagram showing an example of estimating feature overlap in accordance with the method of FIG. 6.

In one arrangement, as seen in FIG. 7, a CGR table 715 is constructed as a hash-table with keys 750 mapping one-to-one to pixel locations in the input image. Hence, the number of keys in the CGR is the same as the resolution (i.e., width by height) of the image as shown at 760 in FIG. 7. For example, if the input frame is ten (10) by ten (10) pixels, then the CGR has one hundred (100) slots with the first slot mapping to pixel (0,0), the second slot mapping to pixel (0,1) and so on. The value fields of the CGR store the identity of contour segments, e.g. 725, 730, 740, 745, in array structures. The identities of contour segments are inserted using a chaining method, such as, for example, chaining with linked lists. The use of a hash table allows the time complexity of performing a pixel location based lookup to be O(1).

If the CGR table 715 has been constructed at step 605, then the method 700 moves from step 605 to accessing step 615. At step 615, the contour segment list determined at step 250 is accessed by the processor 105 from RAM 170. Next, the method 700 proceeds to obtaining step 620, which obtains the next contour segment 'X' 710 from the contour segment list. Next, the method 600 moves to constructing step 625 to construct the Overlap GAbC Lookup Table (OGLT). The Overlap GAbC Lookup Table (OGLT) is indexed by pixel locations, each index pointing to an array of identifiers, each identifier representing a unique determined contour segment (or path) that passes through a corresponding pixel location. The array of identifiers may be referred to as "association information". In one arrangement, the OGLT 770 is constructed as a hash-table with the keys mapping to contour identities, as reference for example at 725, 730 and 740. The value fields 780 of the OGLT 770 store the pixel locations which overlap with the source contour segment 'X' 710. Overlapping pixels are stored in an array structure configured within RAM 170 and are inserted using a chaining method as described above.

Then the method 600 moves to step 630, where the processor 105 is used to traverse to the next pixel location 'Y' 712 in the source contour segment 'X'. Next, the method 600 moves to step 630, where the processor 105 is used to look up all the contour segments in the CGR that pass through pixel location 'Y'. In one arrangement, the CGR is traversed at step 630 by using the pixel location 'Y' as the key to the CGR table and finding all contour segments referenced in the array indexed by the key. The resulting contour segment collection will referred to below as 'Z'.

Then the method 600 moves to the checking step 640, where the processor 105 is used to check whether or not the contour segment collection 'Z' is an empty collection. If the contour segment collection 'Z' is empty, then the method 600 returns to step 630. Otherwise, the method 600 moves to adding step 645 where the resulting contour segment collection 'Z' is added to the OGLT table 770. In one arrangement, the resulting contour segment collection 'Z' is traversed linearly as lookup keys on the OGLT table 770, and pixel location 'Y' is added to the value fields corresponding to the lookup keys using chaining.

Then the method 600 moves to step 650, where the processor 105 is used to check whether or not all pixels 712 in source contour 'X' 710 have been processed. If not all pixels 712 in source contour 'X' 710 have been processed, then the method 700 loops back to step 630. Otherwise, the method 600 moves to step 655.

The following steps of the method 600 are configured for sorting the contour segments (or paths) in the Overlap GAbC Lookup Table (OGLT) based on the amount of overlap with the determined source contour segment 'X' and comparing the number of overlapping pixels of the determined source contour segment 'X' with a predetermined threshold. The method 600 is then configured for adding the source contour segment 'X' to the CGR lookup table if the number of overlapping pixels of the source contour segment 'X' is greater than the predetermined threshold. In particular, at step 655, the processor 105 is used to sort and find the contour segment 790 in the OGLT table that has the most amount of overlapping pixels with the source contour segment 'X' 710. Then the amount of overlap is compared to a predetermined threshold value (also known as duplication threshold). In one arrangement, the value of the duplication threshold is set to fifty (50), indicating a duplication condition is met if contour 790 and source contour 'X' 710 are overlapping by 50% of the total amount of pixels in the source contour 'X'.

If the overlap does not meet the predetermined duplication threshold at step 665, so that the source contour segment 'X' is a unique contour segment, then the method 600 moves to adding step 670. At step 670, the contour segment 'X' is added to CGR. Accordingly, the determined contour segment 'X' is added to the CGR lookup table depending on an overlapping criteria. Then at destroying step 675, the OGLT table is destroyed. Otherwise, if the overlap does meet the duplication threshold at step 665, then the method 600 moves from step 665 directly to step 675 to destroy the OGLT table.

Next, the method 600 proceeds to step 680 to check if all contour segments in the contour segment list are processed. If not all contour segments have been processed, then the method 600 loops back to step 620. Otherwise, the overlap contour filtering process 600 finishes. The filtering executed at step 260 removes duplicate contour segments. If step 250 results in non-overlapping contour segments, then the filtering step 260 may not be performed. Also, the filtering step 260 will never result in an empty set of contour segments because there is always at least one contour segment in the set. The filtering step 260 results in proper non-empty subset of the contours determined in step 250.

Figure 10:
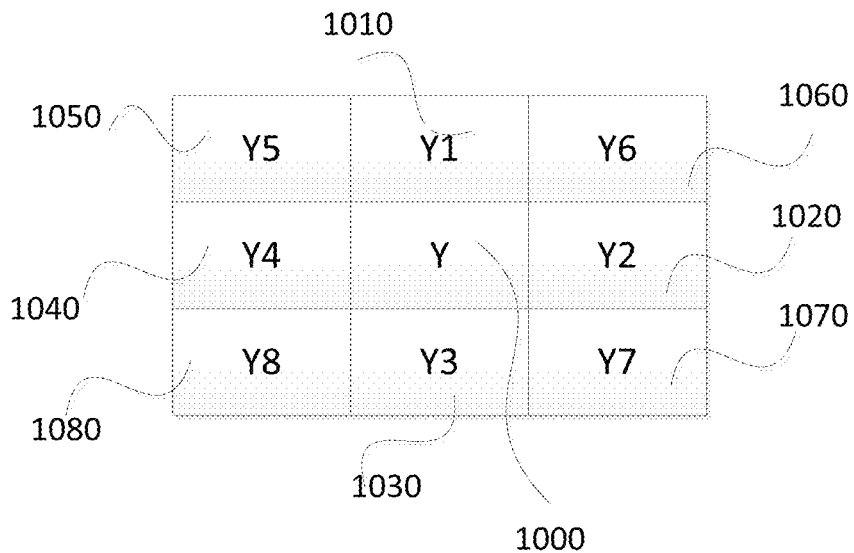
FIG. 10 shows an example of blocks of pixels for illustrating neighbouring pixel support.

In another arrangement, the process of overlapping contour segment filtering is largely the same as the method 600, except that the contour lookup step 635 includes pixel location Y and neighbouring pixels. As an example, FIG. 10 shows block 1000 to block 1080 representing pixels in an image. Block 1000 indicates the pixel Y explained in step 630. The pixels Y1 1010, Y2 1020, Y3 1030, Y4 1040, Y5 1050, Y6 1060, Y7 1070, Y8 1080, are the neighbouring pixels of Y 1000. So at the contour lookup step 635, the resulting contour collection Z is an aggregation of contours that pass through either pixel Y or any of its neighbour pixels, (i.e., Y1 to Y8). Such an arrangement is referred to as nearest neighbour support.

In the nearest neighbour support arrangement, the number of neighbouring pixels used is called connectivity. For example, the term "8 connectivity" refers to all eight (8) neighbouring pixels being used. As another example, the term "4 connectivity" refers to only four (4) neighbouring pixels being used (ie, Y1 1010, Y2 1020, Y3 1030, Y4 1040). The order of arranging the neighbouring pixels shown in FIG. 10 is illustrative only.

Although contour segment filtering by cost in the method 500 and contour segment filter by duplication in the method 600, are two separate methods, the methods 500 and 600 may be combined to achieve the contour segment filtering goal established in step 260. Combining the methods 500 and 600 may be referred to as a "combined filtering process". In one arrangement, the combined filtering process first filters contour segments by cost followed by filtering remaining contours by duplication. The contour segments determined in accordance with such a combined filtering process are both unique and following edges in an image.

Figure 8:
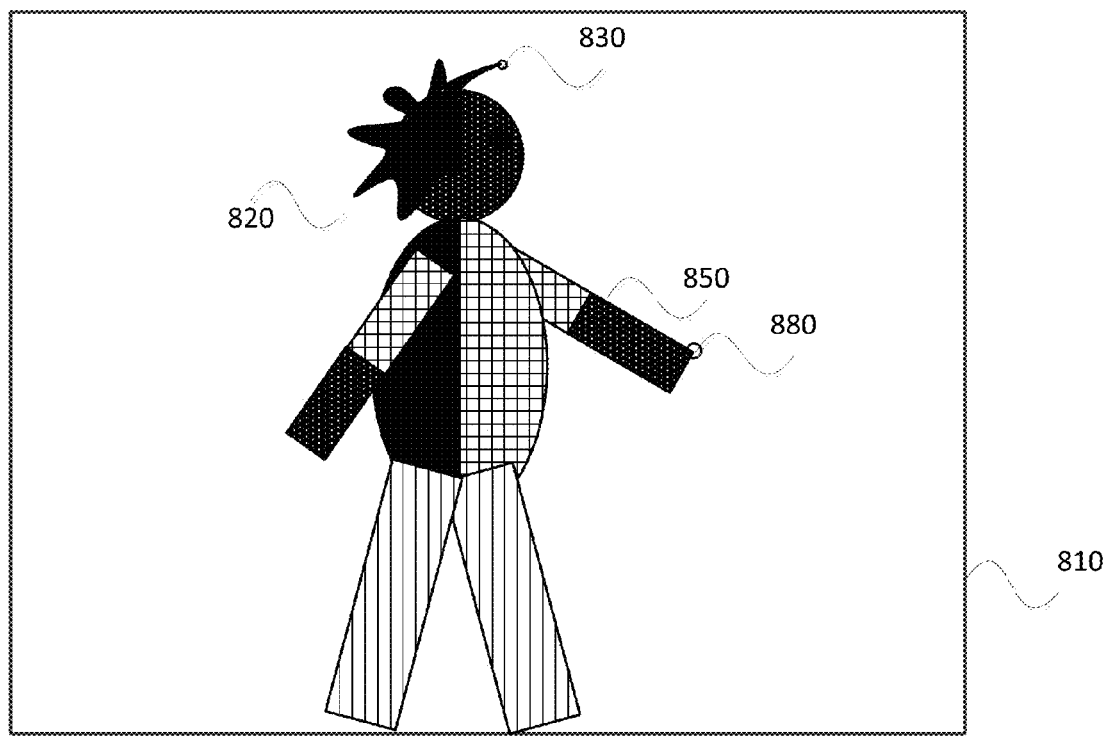
FIG. 8 shows a contour determined from an input image.

FIG. 8 is a schematic diagram that shows a contour determined for an input image. FIG. 8 shows a border 810 of the input image, within which an object representing a human FIG. 820 is found. In the example of FIG. 8, a plurality of anchor points located on a part of the human figure object 820 are determined. For the human figure object 820, two anchor points 830 and 880 are determined and paired using the methods 300 and 900 executed in steps 230 and 240, respectively. The anchor points 830 and 880 are located as part of the object 820 since the anchor points 830 and 880 are the corner of the hair and hand of the human FIG. 820. Also, since the anchor points 830 and 880 are located on the edge of the body of the human figure object 820, the anchor points 830 and 880 indicate the boundary of the human figure object 820. A contour segment 850 connects both anchor points 830 and 880.

Figure 12A:
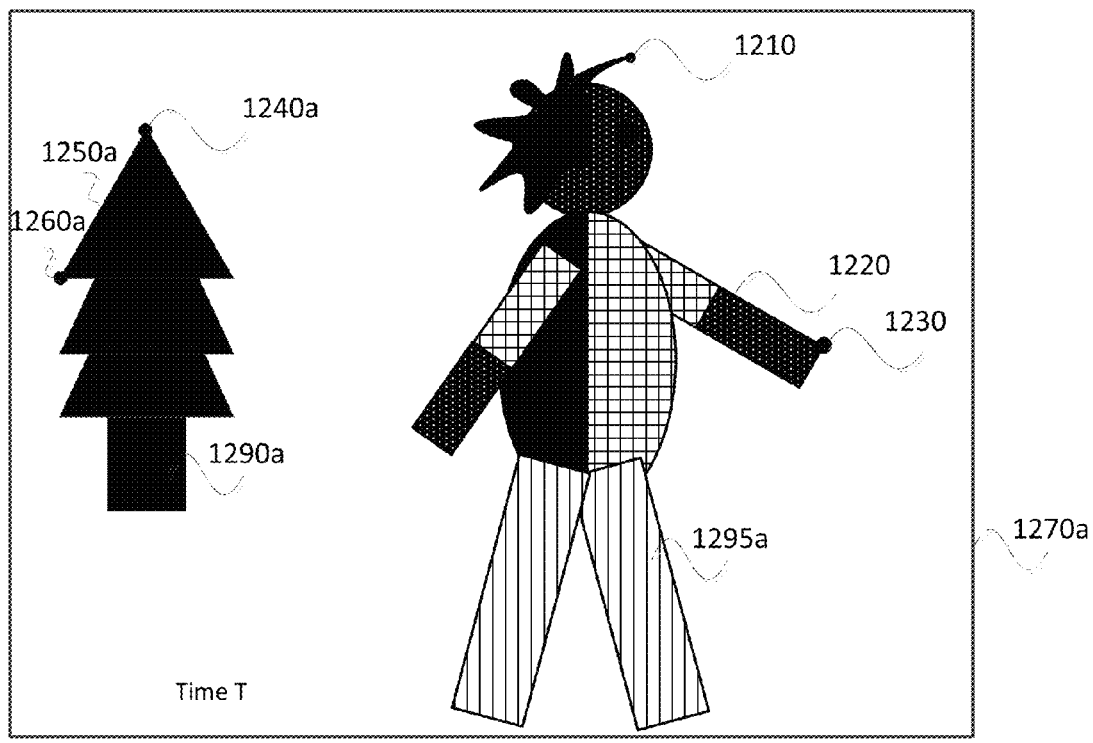
FIG. 12A shows an image of a scene.
Figure 12B:
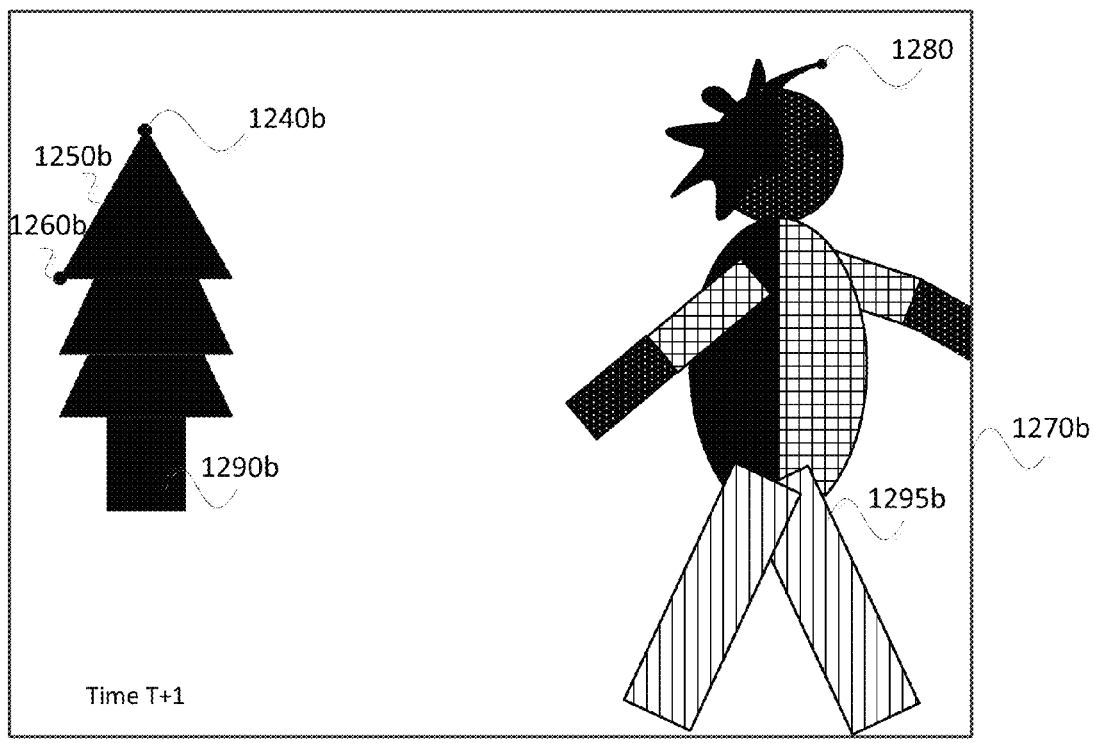
FIG. 12B shows a consecutive image of the scene of FIG. 12A, for illustrating the effect of contour feature determination with anchor pairs tracking between the two consecutive images.

The method 200 will now be described in further detail by way of example with reference to FIGS. 12A and 12B. The example of FIGS. 12A and 12B show the effect of contour feature determination with anchor pairs tracking between two consecutive images. FIG. 12A shows the borders 1270a of an input image of a scene at time T and FIG. 12B shows the border of an input image 1270b captured by the same camera of the scene at time T+1. For convenience, the input image at time T of FIG. 12A will be referred to as the previous image 1270a. For the same reason, the input image at time T+1 of FIG. 12B will be referred to as the subsequent image 1270b.

At time T, the previous image 1270a shows a tree 1290a on the left hand side of a scene and a human 1295a on the right hand side of the tree 1290a. Two anchor points are determined on the tree 1290a (as at step 220), being anchor points 1240a and 1260a. A contour segment 1250a which connects the anchor points 1240a and 1260a is then determined (as at step 250). Anchor points 1210 and 1230 on the human 1295a are also determined (as at step 220) and a contour segment 1220 is determined (as at step 250) which connects the anchor points 1210 and 1230.

At time T+1, the same anchor pairs 1240b and 1260b are determined on the same tree 1290b in subsequent image 1270b. Since the anchor points 1240b and 1260b are determined/tracked successfully (as at step 215), contour 1250b is reused without repeating step 250. Accordingly, the contour 1250b (or path) is determined for the pair of anchor points 1240b and 1260b using the anchor points 1240a and 1260a from the previous image 1270a.

In the same image 1270b, the human 1295b has moved and his hand moved outside of the image 1270b hence the anchor point 1230 from the previous image occurring at time T cannot be tracked (as at step 215). As a result, even though conceptually the same anchor point is determined on the tip of the hair of human 1295b, the anchor point pair 1210 and 1230 is lost. Consequentially, the new anchor point is given a label 1280 and the contour 1220 no longer exist.

The methods described above determine local image features that are suitable for both specific object and object class recognition. The described methods are also suitable for object recognition by parts and are amenable to learn of temporal shape models. The described methods allow straightforward manipulation under geometric transformation and are robust to image noise. In addition, the described local image feature is suitable for modelling objects and image regions of non-uniform intensity and colour, addressing challenges often found in surveillance videos. The described local image feature does not require offline training and possesses robustness properties with respect to photometric and geometric image transformation.

Determination of geodesic anchor-based contour (GAbC) local image features will now be described in further detail. In one arrangement, determination of geodesic active-based contour (GAbC) feature may be performed using the following steps: (1) anchor point determination; (2) anchor pair selection; (3) pairwise edge linking of anchors; (4) removal of overlapping features, and (5) filtering of low quality features. Each of the steps (1), (2), (3), (4) and (5) is described in more detail below and may be implemented as one or more code modules of the software application program 133 resident in the storage module 109 of the camera 100 and being controlled in its execution by the processor 105.

(1) In one arrangement, the first step in determining geodesic active-based contour (GAbC) features is the selection of anchor points. A geodesic active-based contour (GAbC) feature consists of a 4-connected (i.e., as described above) set of pixels representing a single-pixel wide path between two anchor points. Although any random subset of image pixels may be selected as anchors, there is no guarantee that the same set of image pixels will be detected again if the image undergoes an unknown photometric and/or geometric transformation. In other words, a set of anchors that can be re-determined reliably as the point of view of the camera 100 changes, is required. Furthermore, the anchors need to be meaningful in terms of representing the end points of image contours.

Harris corners are suitable for anchor selection because Harris corners have good repeatability. Harris corners are configured to select image pixels of high curvature or at corner locations indicative of the locations of contour intersections. Furthermore, Harris corners are fast to compute and well localised at sub-pixel resolution. For these reasons, Harris corners are very suitable as the anchor selection method for determination of geodesic active-based contours (GAbC). When a scene under consideration has lots of uniform or flat texture, such as a white-coloured wall, few corner points are determined for an image of the scene. Conversely, when the scene contains foreground with many highly contrasted edges/non-uniform texture such as a plant with a lot of leaves, many corner points on the plant are determined. Applying non-maximum suppression allows the number of detected corners in highly textured image regions to be limited.

(2) As described above, in one arrangement, the second step in determination of geodesic active-based contour (GAbC) features is to select pairs of anchors to connect. Only pairs of anchors that belong to the same object are considered, since contours that originate, for example, on a moving object and terminate on a background object give rise to unreliable features. Since feature determination is a bottom up method with no knowledge of the objects in the scene, it is not possible to make such a decision reliably. Instead, a straightforward heuristic may be applied for pairing anchor points. The described methods may be configured to remove unreliable features that cross object boundaries. The heuristic pairs two anchor points if the Euclidean distance of the two anchor points is between a minimum and maximum threshold value. The minimum and maximum values may be determined by the application and image or the minimum and maximum values may be set to specific values empirically.

(3) As described above, in one arrangement, the third step for determination of geodesic active-based contour (GAbC) local features is finding the contour connecting a pair of anchor points. The contour represents the path on the image that follows a strong edge and leads from the start anchor to the end anchor. A basis is needed for choosing one pixel over another for membership to the path. Image contours that are collections of pixels where the image gradient magnitude is large may be determined for choosing one pixel over another for membership to the path. Simultaneously, a more direct path may be selected over a path that traverses much of the image.

An image may be considered as a graph such that each pixel is a node. Considering 4-neighbour connectivity for each pixel of the image, each node in the graph is connected to 4 other nodes. Each such edge has a weight which is a function of the gradient strength at that pixel. Gradient strength can be determined efficiently using convolution masks preceded by Gaussian smoothing for robustness to image noise. Anchors coincide with nodes in the graph. To find the path connecting two nodes any suitable graph search algorithm can be employed. There are many graph search algorithms that may be used to determine the path connecting two nodes. The graph search algorithm used in accordance with the described arrangements is selected to find a good balance between minimising running time and memory usage especially considering that the search is on a large graph. For example, for high definition video the number of nodes would be 1920*1080=2073600 and the number of edges four times that (considering 4-neighbour pixel connectivity).

Naive search methods such as a depth-first search can take too long to find a solution for such a large graph while a breadth-first search has large memory requirements because of a large number of nodes that must be explored. Heuristic search algorithms are guided by a heuristic function looking for a balance between computational efficiency and lowered memory requirements. One such Heuristic search algorithm, which is very similar to a breadth-first search, explores significantly fewer nodes and to find a shortest in terms of path cost (the total sum of gradient magnitudes of the pixels on the path), solution to a query is A*. The A* algorithm is an improvement on a standard breadth-first search algorithm enhanced with a guiding heuristic function that reduces the number of graph nodes explored. The heuristic is an estimate of the cost-to-goal from the node under consideration; if the heuristic does not overestimate the true cost-to-goal then the algorithm finds the lowest cost path to the goal, if one exists. A heuristic cost function that is admissible for the above described graph imposed over the image is the Manhattan distance between two pixels. The Manhattan distance is added to the path cost in order to satisfy the requirement that the path connecting two anchors follows strong image edges. Indication to image edges is provided by the value of gradient magnitude at each pixel.

As described above, in determining the edge weight it is desirable for features to follow strong edges in the image and to avoid cutting through regions of uniform texture. Hence, the function for determining the edge weights emphasises connections between pixels with high gradient. Consider the following equation (energy function), $$c(n) = (1.0 - |dI(n)|)^m \qquad (3)$$

where m>=1 and |dI(n)| denotes the gradient magnitude at pixel n. Equation (3) is configured such that the larger the gradient, the lower the weight. In addition, by increasing the value of m, regions with high gradient are emphasised. A qualitative evaluation of Equation (3) found that for m=3 the image regions with high gradient are well emphasised. Furthermore, since the energy function takes values in the interval [0 . . . 1], taking larger powers can result in numerical underflow. Therefore, the value of m is fixed to three (3). Alternative cost functions may be employed including one that evaluates the curvature at each pixel similarly to the one used in the Harris corner detector or the probabilistic edge function.

The determination of geodesic active-based contour (GAbC) features as described above might generate thousands of features per image. Typically, a geodesic active-based contour (GAbC) feature consists of hundreds of pixels (all unique locations). Given such a large number of features in a single image, it is likely that there is some overlap at various degrees (e.g, from 0% to near 100%). Overlapping features may be referred to as a duplicate and an incremental algorithm for determining and eliminating the overlapping features is described below. In one arrangement, an overlap detection algorithm may be used where the overlap detection algorithm consists of the following two (2) steps:

1. Given the set of the first N geodesic active-based contour (GAbC) features determined from the current image (or frame), the feature with maximum overlap with the N+1$^{th}$ feature is determined.
2. The N+1 geodesic active-based contour (GAbC) feature is eliminated if the amount of overlap is above a given percentage as determined by the target application. Otherwise, the N+1 geodesic active-based contour (GAbC) feature is stored.

In order to find the maximum overlapping feature, a mapping is maintained between each pixel and the geodesic active-based contour (GAbC) features that contain that pixel. The mapping may be stored in the RAM memory 170. The mapping may be configured as an array of blocks 715 as shown for example in FIG. 7. That is, for each image location, a linked list of geodesic active-based contour (GAbC) features that pass through the pixel in that image location, is maintained. A pixel location is represented by the (x, y) coordinates of the pixel.

In FIG. 7, the array of blocks 715 is called "current GAbC records (CGR)". Each block in the array of blocks 715 corresponds to a pixel coordinate. For example, the 0th block corresponds to pixel (0, 0), the 1st block corresponds to pixel (0, 1), etc. Each block in the array of blocks 715 stores the list of GAbC features that contain the pixel that the block represents. For example, both GAbC s 1 (725) and 2 (730) pass pixel (0, 0) in FIG. 7.

Assume that a new feature resulting from connecting two anchor points is given and the amount of overlap between the new feature and features determined previously must be determined. Three steps are required to find the maximum overlap geodesic active-based contour feature (MOG). First, for each pixel in the new geodesic active-based contour (GAbC), the current GAbC records (CGR) map is looked up to find if any geodesic active-based contour (GAbC) feature(s) in the existing pool also contain the pixel. Second, every pixel contained in one or more geodesic active-based contour (GAbC) features, requires an addition or update in the overlap GAbC lookup table (OGLT). The third step is traversing the overlap GAbC lookup table (OGLT) once to find the feature with the maximum number of overlapping pixels.

The overlap GAbC lookup table (OGLT) may be configured as a lookup table containing a list of key, value pairs. The keys are the geodesic active-based contour (GAbC features and the values are the list of overlapping pixels between the geodesic active-based contour (GAbC) features in the key and the new geodesic active-based contour (GAbC) features. For example, if there is an overlap between GAbC 1 725 and the new geodesic active-based contour (GAbC) feature, then there is an entry in the overlap GAbC lookup table (OGLT), GAbC 1 725 is one of the keys in the table and the overlapping pixels between GAbC 1 725 and the new geodesic active-based contour (GAbC) feature are the values associated with the key. The overlap GAbC lookup table is initialised as empty when the overlap detection algorithm starts and destroyed when the maximum overlap geodesic active-based contour feature (MOG) for the new feature under consideration is found.

When updating the overlap GAbC lookup (OGLT) table, the software application program 133 first looks up the overlap GAbC lookup (OGLT) table, checking if the geodesic active-based contour (GAbC) feature under consideration is already in the overlap GAbC lookup (OGLT) table. If the geodesic active-based contour (GAbC) feature under consideration is not already in the overlap GAbC lookup (OGLT) table, the geodesic active-based contour (GAbC) feature under consideration is added. If the geodesic active-based contour (GAbC) feature under consideration is already in the overlap GAbC lookup (OGLT) table, the pixel location is added to the value part of an entry in the overlap GAbC lookup (OGLT) table corresponding to the geodesic active-based contour (GAbC) feature. After iterating all the pixels in the new geodesic active-based contour (GAbC) feature, overlap GAbC lookup (OGLT) is walked once to find the geodesic active-based contour (GAbC) feature with the maximum number of overlapping pixels.

Given the pair of geodesic active-based contour (GAbC) features which are the last determined 710, as seen in FIG. 7, and a corresponding maximum overlap feature 790 determined, a decision is made as to whether the geodesic active-based contour (GAbC) feature 710 should be retained or discarded. The decision is made with respect to a threshold value on the percentage of overlap between the two geodesic active-based contour (GAbC) features and the decision is application specific. For example, the decision as to whether the geodesic active-based contour (GAbC) feature might be required that any overlap above 20% is not desirable and as such features with a maximum overlap above the 20% threshold number should be discarded.

As described above, the maximum overlap feature determined is with respect to the newest geodesic active-based contour (GAbC) feature and the maximum overlap feature depends on the order in which geodesic active-based contour (GAbC) features are determined. For example, consider two geodesic active-based contour (GAbC) features the longest of which is twice that of the shorter. If the short geodesic active-based contour (GAbC) feature is determined first followed by the longest geodesic active-based contour (GAbC) feature then the overlap percentage is estimated as 50% with respect to the longer geodesic active-based contour (GAbC) feature and most recently determined geodesic active-based contour (GAbC) feature. If the longer geodesic active-based contour (GAbC) feature was determined first, then the overlap percentage is estimated as 100%. Such asymmetric behaviour may be undesirable for a given target application.

In one arrangement, anchor point pairs are connected in order of their Euclidean distance. That is, anchor pairs are connected from farthest away to closest so that the longer contour segments are determined first and the shorter contour segments with large amount of overlap are eliminated. The heuristic is application specific and does not require any modification to the overlap detection algorithm for determining the maximum overlapping feature.

The graph-based search algorithm described above always finds the lowest cost path connecting two anchor points. However, finding the lowest cost path connecting two anchor points doesn't necessarily mean that the computed geodesic active-based contour (GAbC) traces an image contour. Because of the naive heuristic employed for anchor point pair selection in the graph-based search algorithm described above, there is a high probability that the found geodesic active-based contour traverses image regions of low gradient. The found geodesic active-based contour may traverse image regions of low gradient, for example, when the selected anchors originate on two different scene objects. To remove the undesirable geodesic active-based contour (GAbC) features, a filtering step is performed. The filtering may be based on the per-pixel cost of the computed path between two anchors. The cost for each pixel is given by the energy function equation. By visual inspection using the collection of images used for the empirical evaluation, it was determined that removing those geodesic active-based contour (GAbC) features that contain pixels with a cost higher than 0.7 reduces the set of geodesic active-based contour (GAbC) features determined from a single frame to those geodesic active-based contour (GAbC) features most likely to represent parts of objects.

The determination of geodesic anchor-based contour features described above is configured for image matching and object recognition. The determination of geodesic anchor-based contour features is construction invariant to image translation and rotation and exhibits some robustness to image scale, blurring, and illumination changes. The determined features exhibit good repeatability in situations of large image warping.

INDUSTRIAL APPLICABILITY

The arrangements described are applicable to the computer and data processing industries and particularly for image processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of determining a contour segment for an object in an image captured by a camera, the method comprising:
   determining a plurality of corner points located on a part of an object in the image, wherein each corner point represents a location of a corner of the object;
   selecting pairs of corner points from the determined corner points;
   determining a path for at least one of the pairs of corner points, the path connecting the corner points of the at least one pair of corner points along the boundary of the object; and
   determining the contour segment for the object using the determined path.

2. The method according to claim 1, wherein the determined contour segment starts at one of the corner points in the at least one pair and ends at the other corner point in the at least one pair, each of the pairs having two corner points.

3. The method according to claim 1, wherein each of the corner points represents a change in direction of an image gradient corresponding to a boundary of the object.

4. The method according to claim 1, wherein the path is determined using an energy function of an image gradient magnitude and a path length.

5. The method according to claim 1, where the corner points in each of the selected corner point pairs are within a predetermined distance on the object.

6. The method according to claim 1, further comprising representing the object using the determined path and one or more further paths determined for the object, if the determined path and the one or more further paths overlap each other.

7. The method according to claim 1, wherein the plurality of corner points are determined using a corner detector.

8. The method according to claim 1, further comprising:
   determining whether the determined corner points are new corner points or occurred in a previous frame.

9. A method of determining a contour segment for an object in an image captured by a camera, the method comprising:
   determining a plurality of corner points located on a part of an object in the image;
   selecting pairs of corner points from the determined corner points;
   determining a path for at least one of the pairs of corner points, the path connecting the corner points of the at least one pair of corner points along the boundary of the object;
   determining the contour segment for the object using the determined path;
   determining association information about the at least one pair of corner points from a previous image; and
   determining the path for the at least one pair of corner points using the association information.

10. The method according to claim 6, further comprising populating a lookup table storing paths that do not overlap with each other.

11. The method according to claim 10, further comprising searching a lookup-table and selecting any paths stored in the look-up table overlapping the determined path.

12. The method according to claim 6, wherein the determined path overlaps a further path.

13. The method according to claim 6, further comprising adding the determined path to a lookup-table depending on an overlapping criteria.

14. The method according to claim 6, further comprising maintaining a lookup table indexed by pixel locations, each index pointing to an array of identifiers, each identifier representing a unique determined path that passes through a corresponding pixel location.

15. The method according to claim 6, further comprising:
   determining a further path that passes through a pixel location of the determined path, using a first lookup table; and
   storing the further path in a second lookup-table together with an identifier for the determined path, the identifier pointing to an array of pixels locations that overlap with the determined path.

16. The method according to claim 15, further comprising:
   sorting the paths in the second lookup table based on the amount of overlap with the determined path, wherein the further path has maximum overlap with the determined path;
   comparing the number of overlapping pixels of the determined path with a predetermined threshold; and
   adding the further path to the first lookup-table if the number of overlapping pixels of the determined path is greater than the predetermined threshold.

17. An apparatus for determining a contour segment for an object in an image captured by a camera, the apparatus comprising:
   at least one processor that operates to:
   determine a plurality of corner points located on a part of an object in the image, wherein each corner point represents a location of a corner of the object;
   select pairs of corner points from the determined corner points;
   determine a path for at least one of the pairs of corner points, the path connecting the corner points of the at least one pair of corner points along the boundary of the object; and
   determine the contour segment for the object using the determined path.

18. A system for determining a contour segment for an object in an image captured by a camera, the system comprising:
   a memory for storing data and a computer program; and
   a processor coupled to said memory for executing said computer program, said computer program comprising instructions for:
   determining a plurality of corner points located on a part of an object in the image, wherein each corner point represents a location of a corner of the object;
   selecting pairs of corner points from the determined corner points;
   determining a path for at least one of the pairs of corner points, the path connecting the corner points of the at least one pair of corner points along the boundary of the object; and determining the contour segment for the object using the determined path.

19. A non-transitory computer readable medium storing a computer program for causing a processor to execute a method for determining a contour segment for an object in an image captured by a camera, the method comprising:
   determining a plurality of corner points located on a part of an object in the image, wherein each corner point represents a location of a corner of the object;
   selecting pairs of corner points from the determined corner points;
   determining a path for at least one of the pairs of corner points, the path connecting the corner points of the at least one pair of corner points along the boundary of the object; and
   determining the contour segment for the object using the determined path.

20. The method according to claim 3, wherein each of the corner points represents a change in horizontal and vertical directions.

21. The method according to claim 1, wherein each corner point is an image location of high curvature where a corresponding image gradient exhibits a large change in both horizontal and vertical directions and where each corner point represents a change in direction of the image gradient corresponding to a boundary of the object.

* * * * *